United States Patent
Son

(10) Patent No.: US 12,387,141 B2
(45) Date of Patent: Aug. 12, 2025

(54) SYSTEMS AND METHODS FOR PROBABILISTIC REPRESENTATION-BASED MACHINE LEARNING

(71) Applicant: Scedastic AI, Inc., Seattle, WA (US)

(72) Inventor: Kevin Sukmin Son, Seoul (KR)

(73) Assignee: Scedastic AI, Inc., Seattle, WA (US)

( * ) Notice: Subject to any disclaimer, the term of this patent is extended or adjusted under 35 U.S.C. 154(b) by 11 days.

(21) Appl. No.: 18/430,602

(22) Filed: Feb. 1, 2024

(65) Prior Publication Data
US 2025/0238717 A1    Jul. 24, 2025

Related U.S. Application Data

(60) Provisional application No. 63/623,295, filed on Jan. 21, 2024.

(51) Int. Cl.
*G06N 20/00* (2019.01)
(52) U.S. Cl.
CPC .................................. *G06N 20/00* (2019.01)
(58) Field of Classification Search
CPC .. G06N 7/01; G06N 7/00; G06N 5/00; G06N 5/02; G06N 5/01; G06N 5/04
See application file for complete search history.

(56) References Cited

PUBLICATIONS

Nemani et al., Uncertainty quantification in machine learning for engineering design and health prognostics: A tutorial, 2023 (Year: 2023).*
Liang et al., Pruning and quantization for deep neural network acceleration: A survey, 2021 (Year: 2021).*
Bailly et al., Grammatical Inference as a Principal Component Analysis Problem, 2009 (Year: 2009).*
Bacciu et al., Probabilistic Modeling in Machine Learning, 2015 (Year: 2015).*
Alan E. Gelfand et al., "Sampling-Based Approaches to Calculating Marginal Densities", Journal of the American Statistical Association, vol. 85, Issue 410, Jun. 1990, 13 pgs.
Augusta H. Teller et al., "Equation of State Calculations by Fast Computing Machines", The Journal of Chemical Physics, vol. 21, Issue 6, Jun. 1953, 24 pgs.

(Continued)

*Primary Examiner* — David Yi
*Assistant Examiner* — Charles C Kuo
(74) *Attorney, Agent, or Firm* — Morgan, Lewis & Bockius LLP

(57) ABSTRACT

An example machine-learning component includes an input layer configured to receive a set of inputs and a probabilistic machine-learning model coupled to the input layer, the probabilistic machine-learning model including a set of nodes sparsely coupled to one another in accordance with associations learned from a set of previously-received inputs. The set of nodes include a first subset configured to generate a set of intermediate probability distribution representations (PDRs) by aggregating respective subsets of the set of inputs, and a second subset configured to generate a set of final PDRs based on the set of inputs and the set of intermediate PDRs. The example machine-learning component further includes an output layer configured to generate an inference for the set of inputs by applying an independent component analysis to the set of final PDRs.

20 Claims, 22 Drawing Sheets

(56) References Cited

PUBLICATIONS

David M. Beal et al., "Variational Inference: A Review for Statisticians", Journal of the American Statistical Association, vol. 112, Issue 518, May 2018, 41 pgs.

Laurent Valentin Jospin et al., "Hands-on Bayesian Neural Networks—A Tutorial for Deep Learning Users", IEEE Computational Intelligence Magazine, vol. 17, Issue: 2, May 2022, 28 pgs.

Matthew J. Beal., "Variational Algorithms for Approximate Bayesian Inference", Doctoral Thesis, The Gatsby Computational Neuroscience Unit, University College London, May 2003, 281 pgs.

Nitish Srivastava et al., "Dropout: A Simple Way to Prevent Neural Networks from Overfitting", Journal of Machine Learning Research 15, Jun. 2015, 30 pgs.

Radford M. Neal., "Bayesian Learning for Neural Networks", Springer, Dec. 2012, 195 pgs.

Stuart Geman et al., "Stochastic Relaxation, Gibbs Distributions, and the Bayesian Restoration of Images", IEEE Transactions on Pattern Analysis and Machine Intelligence, vol. PAMI-6, Issue: 6, Nov. 1984, 21 pgs.

W. K. Hastings, "Monte Carlo Sampling Methods Using Markov Chains and Their Applications", Biometrika, vol. 57, Issue 1, Apr. 1970, 13 pgs.

Yann LeCun et al., "Deep Learning", Nature 521, May 2015, 10 pgs.

Yarin Gal et al., "Dropout as a Bayesian Approximation: Appendix", Machine Learning, 2015, 20 pgs.

Yarin Gal et al., "Dropout as a Bayesian Approximation: Representing Model Uncertainty in Deep Learning", Proceedings of the $33^{rd}$ International Conference on Machine Learning (PMLR), vol. 48, 2016, 10 pgs.

\* cited by examiner

Model Parameters

Network Parameters — 1204-1
- Time Step Start: 123 — 1205
- Time Step Interval: 2
- Interval Neuron State Check: 7
- Interval Connection Update: 22 — 1206

Generate Parameters — 1204-2
- Accept Reject Bounds: 15
- Mode Energy: 65
- Signal Energy Boost: 0.2

Back Propagate Parameters — 1204-3
- Agreement Awake Max Interval: 300
- Agreement Candidate Max Interval: 75
- Aggregate Feedback Discount: 0.7
- Weight Learning Rate: 0.3

Common Parameters — 1204-4
- Expectation Moving Average Alpha: 0.8
- Entropy State Toggle Deviation: 0.3
- Entropy State Toggle Margin: 0.02
- Interval Entropy Short Mean: 200
- Interval Entropy Long Mean: 750

Connection Management Parameters — 1204-5
- Proximity Default Span: 5
- Proximity Span Expand Rate: 0.4

SYSTEMS AND METHODS FOR PROBABILISTIC REPRESENTATION-BASED MACHINE LEARNING

PRIORITY

This application claims the benefit of, and priority to, U.S. Provisional Application 63/623,295, filed Jan. 21, 2024, which is hereby incorporated by reference in its entirety.

TECHNICAL FIELD

The disclosed embodiments relate generally to machine-learning architectures including, but not limited to, systems and methods for providing inferences using probabilistic machine-learning models.

BACKGROUND

Observation data gathered through a single sensor over time or through convolution can often have a complex distribution. Latent information spread across multiple sensors and the stochasticity coming from many sources can further complicate any analysis. The complex nature of such analysis is illustrated by the computational complexity of probabilistic models. For instance, the exact Gaussian Process has the computational complexity of $O(n^3)$, with n being the number of data points.

Conventional deep-learning approaches avoid having to understand the world by performing specialized tasks. A neutral network with depth can be trained to discover key causal factors and the hierarchical relationships between them, given sufficient compute resources and data. But such networks perform poorly in artificial general intelligence (AGI). For example, large language models (LLMs) may mimic dialogues well, but have little or no understanding of the world. Thus, such models may respond with superficial or factually-incorrect replies, and exhibit limited signs of cognition such as working memory and inductive reasoning. Moreover, these models do not learn continuously and require offline training.

In order to scale up generalization toward human-level cognition, it is not sufficient for a model to perform well with additive training data. The model needs to understand the world to perform well with new tasks. It should learn lasting representations of the world along with problem-solving skills.

SUMMARY

Probabilistic models generalize better than linear models as they can capture non-linear hierarchical relationships well and thus are less vulnerable to uncertainty when interfacing with the real world. A scalable probabilistic model allows a deep stack of generative and inference functions. Such deep-structured probabilistic models can learn lasting reusable representations that adapt with incremental updates when learning new tasks. This enables zero- or one-shot learning that furthers understanding of the world.

The present disclosure describes, among other things, a deep-structured probabilistic model that reduces/minimizes information loss and computational complexity through Gaussian mixture composition and decomposition. Information loss can be reduced/minimized through use of (i) non-parametric approximation on both forward and backward propagations, and (ii) unbiased probabilistic transforms (e.g., probability distribution representations (PDRs)) that allow for ideal fit behavior. The PDR (also sometimes called a probability distribution function) can be considered a non-biased estimator with variance reducing properties. Computational complexity can be reduced/minimized due to (i) the non-parametric approximations on the forward and backward propagations (which avoid m-dimensional matrix multiplication calculations), (ii) variance reducing properties of the model, (iii) sparse connections of the model (e.g., each neuron capacity applies to limited range of source/target neurons), and (iv) high-entropy stationary representations. There can be another numerical computational advantage as numbers close to zero or infinity are rarely considered.

For example, neurons of the model can output PDRs over time, where each neuron aggregates inputs and simplifies into a PDR. In this way, downstream layers have more distinct outputs and less combinatorial possibilities. In this example, similar signals are combined, and capacity is freed up to handle latent signals, which can magnify resolution (e.g., low variance neurons magnify resolution of the surroundings).

In accordance with some embodiments, a method of providing inferences using probabilistic machine-learning includes receiving a set of inputs at a probabilistic machine-learning model, where the probabilistic machine-learning model comprises a set of nodes sparsely coupled to one another in accordance with associations learned from a set of previously received inputs. The method further includes generating, via a first subset of the set of nodes, a set of intermediate probability distribution representations (PDRs) by aggregating respective subsets of the set of inputs, where (i) the set of intermediate PDRs is approximated from the aggregated respective subsets of the set of inputs, and (ii) generating the set of intermediate PDR includes, in accordance with a determination that an entropy of inputs at a respective node of the first subset of nodes does not converge (e.g., the entropy is below an entropy threshold), connecting the respective node to one or more additional nodes of the set of nodes. The method also includes generating, via a second subset of the set of nodes, a set of final PDRs based on the set of inputs and the set of intermediate PDRs, and generating an inference for the set of inputs by applying an independent component analysis to the set of final PDRs. In some embodiments, an amount of unexpected approximation for the PDRs corresponds to an amount of change in the inputs (e.g., whether the system is in a steady state or changing).

In accordance with some embodiments, a method of utilizing a probabilistic machine-learning model with no offline training to provide query responses includes: (i) receiving a user query from a user device; (ii) providing the user query to a computing system that includes a probabilistic machine-learning model, where the probabilistic machine-learning model has learned a set of associations based on input data from a plurality of earlier queries and without any offline training; (iii) in response to providing the user query, receiving a response from the probabilistic machine-learning model, where the response is generated based on approximate probability distributions identified by the probabilistic machine-learning model in response to the user query; and (iv) sending information about the response from the probabilistic machine-learning model to the user device.

In accordance with some embodiments, a method of utilizing a probabilistic machine-learning model with no offline training to provide inferences includes: (i) providing a query to a computing system that includes a probabilistic machine-learning model a first time, where the probabilistic machine-learning model has a set of learned associations based on input data from a plurality of earlier queries and without any offline training; (ii) after providing the query, receiving a first response to the query and presenting information about the first response to a user device; (iii) providing the query to the computing device a second time; and (iv) after providing the query the second time, receiving a second response to the query and presenting information about the second response to the user device, where content of the second response is distinct from content of the first response.

In accordance with some embodiments, a method of generating responses using a probabilistic machine-learning model includes: (i) receiving a user query; (ii) generating a set of inputs based on the user query; (iii) providing the set of inputs to a computing system that includes a probabilistic machine-learning model; (iv) in response to the providing, receiving an inference from the computing system, where the inference is based on applying an independent component analysis to a set of approximate probability distribution representations (PDRs) generated from the set of inputs; and (v) generating a response to the user query based on the received inference.

In accordance with some embodiments, a method of generating responses using a probabilistic machine-learning model includes: (i) receiving a set of inputs at a probabilistic machine-learning model that comprises a set of nodes; (ii) at a node of the set of nodes: (a) receiving a set of input signals corresponding to the set of inputs from a first subset of the set of nodes; and (b) generating, based on the received set of input signals, a forward signal comprising a set of approximate probability distribution representations and a feedback signal comprising a set of feedback amplitudes and directions; (iii) providing the forward signal to a second subset of the set of nodes and providing the feedback signal to the first subset of the set of nodes; and (iv) updating operating states of the first subset of the set of nodes based on the feedback signal.

In accordance with some embodiments, a method of providing inferences using probabilistic machine-learning includes: (i) receiving a set of inputs at a probabilistic machine-learning model; (ii) generating, via the probabilistic machine-learning model, a set of approximate probability distribution representations (PDRs) from the set of inputs; and (iii) generating an inference for the set of inputs by applying an independent component analysis to the set of approximate PDRs.

In accordance with some embodiments, a computing system is provided. The computing system includes one or more processors (e.g., CPU(s), GPU(s), and/or NPU(s)) and memory storing one or more programs. The one or more programs include instructions for performing any of the methods described herein. For example, the computing system may include one or more electronic devices, one or more servers, and/or one or more distributed (e.g., cloud) computing systems.

In accordance with some embodiments, a non-transitory computer-readable storage medium is provided. The non-transitory computer-readable storage medium stores one or more programs for execution by a computing system with one or more processors. The one or more programs comprise instructions for performing any of the methods described herein.

Thus, devices and systems are disclosed with methods for providing inferences. Such methods, devices, and systems may complement or replace conventional methods, devices, and systems for providing inferences.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 12A-12C illustrate an example user interface for adjusting example model parameters in accordance with some embodiments.

DETAILED DESCRIPTION

The present application describes, among other things, systems, devices, and methods of using probabilistic machine-learning (e.g., to provide inferences). In an example, a set of inputs is received at a probabilistic machine-learning model, a set of approximate probability distribution representations (PDRs) is generated from the set of inputs, and an inference is generated for the set of inputs by applying an independent component analysis to the set of approximate PDRs. Using a probabilistic machine-learning model rather than a linear model allows capture of non-linear hierarchical relationships. Using approximate PDRs as opposed to exact solutions simplifies computations. Having a sparsely connected model also reduces computational complexity as compared to fully connected models. The probabilistic machine-learning model is an example of a scalable probabilistic model that can learn lasting reusable representations (e.g., identifying recurring patterns) that adapt with incremental updates when learning new tasks.

As described in greater detail below, a probabilistic model may be composed of a set of nodes (also sometimes referred to as "neurons") that are sparsely coupled to one another based on learned associations. Each node of the set of nodes may be configured to generate an approximate PDR by aggregating signals from a respective subset of the set of nodes. Each node and its signal occupy a unique space and the relationship can be described in agreement probability and covariance over time. In this way, over time, the probabilistic mode can identify stable low variance connections. The probabilistic machine-learning models described herein may be configured to maximize energy (e.g., information) flow with a minimal set of connections. For example, stationary representations are discovered, and volatility causes exploration of new connections.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1B:
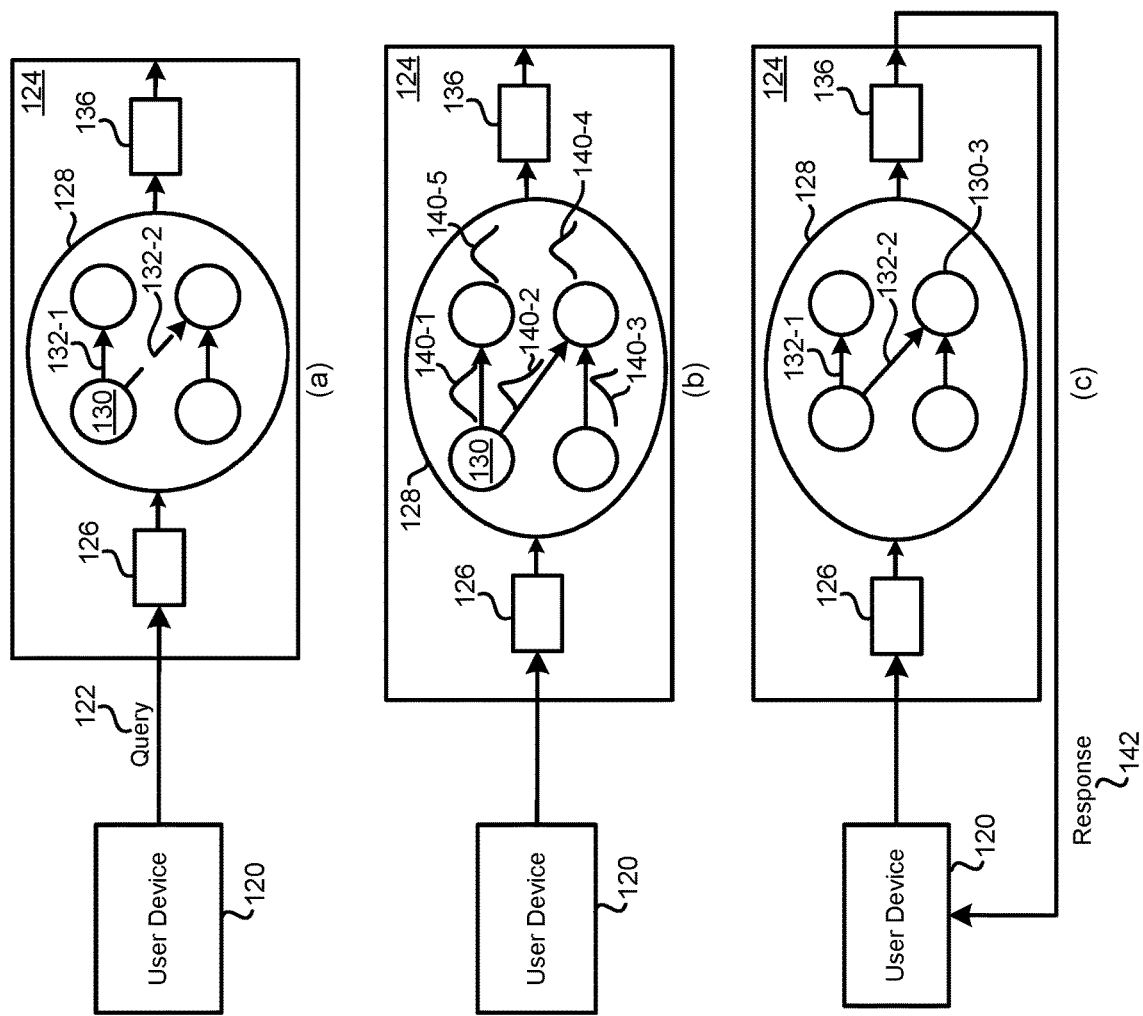
FIG. 1B is a block diagram illustrating example operation of an example system for providing inferences in accordance with some embodiments.
Figure 1A:
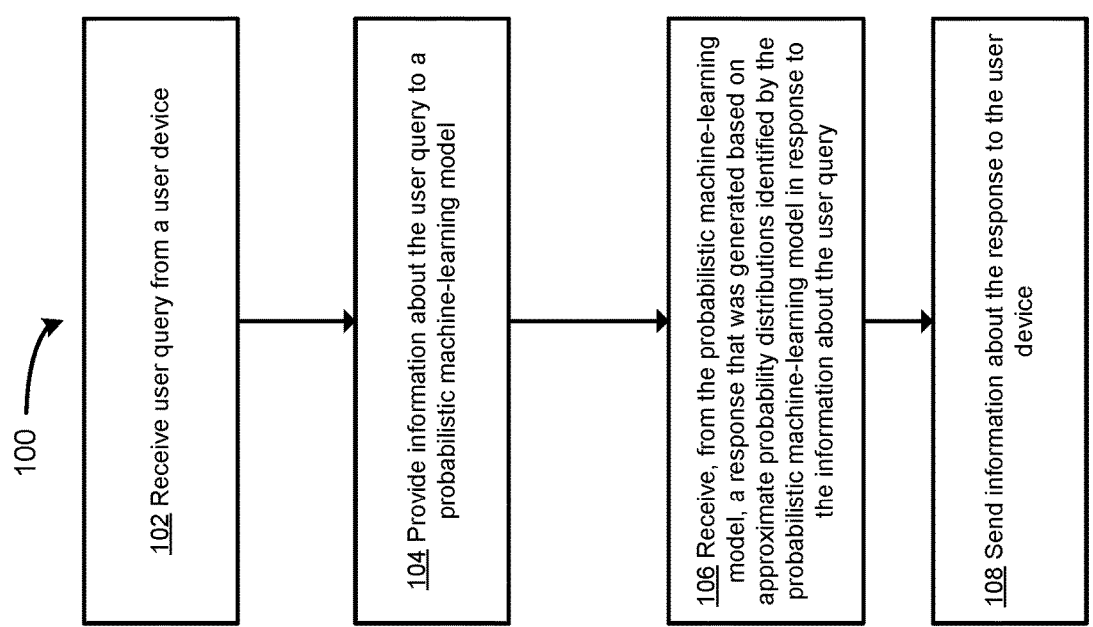
FIG. 1A is a flow diagram illustrating an example process for providing inferences in accordance with some embodiments.

FIG. 1A is a flow diagram illustrating a method 100 for providing inferences in accordance with some embodiments. The method 100 may be performed at a computing system (e.g., including one or more servers and/or one or more user devices) having one or more processors and memory storing instructions for execution by the one or more processors. In some embodiments, the method 100 is performed by executing instructions stored in the memory (e.g., the memory 622 in FIG. 6) of the computing system.

The system receives (102) a user query from a user device. In some embodiments, the system receives context information with the user query. The context information may include information about the user device, information about a user of the user device, information about previous queries from the user device, and/or other types of context information.

The system provides (104) information about the user query to a probabilistic machine-learning model. For example, the system converts the user query to a vector representation and provides the vector representation to the machine-learning model. In some embodiments, the user query is pre-processed to generate the information about the user query using a pre-processing component (e.g., a natural language processing component).

In some embodiments, the probabilistic machine-learning model includes a set of nodes that are sparsely coupled to one another based on learned associations, where each node of the set of nodes is configured to generate an approximate PDR by aggregating signals from a respective subset of the set of nodes. In some embodiments, the probabilistic machine-learning model includes a set of nodes and a set of connections that interconnect the set of nodes, a connection of the set of connections includes a set of connection parameters, and the set of connection parameters includes a weight parameter, an agreement parameter, and a connection state parameter. In some embodiments, the agreement parameter is determined based on a logistic regression aggregation.

In some embodiments, each node in the set of nodes is configured to provide a primary component signal and a secondary component signal to a respective second subset of the set of nodes. In some embodiments, the set of nodes is arranged in a plurality of virtual layers. In some embodiments, a node (e.g., each node) is configured to combine a set of input signals into an approximate distribution, delineate signal and noise, determine a feedback amplitude and direction, and update one or more node states. In some embodiments, delineating signal and noise comprises categorizing input signals as either signal or noise based on a primary component aggregate direction. In some embodiments, the node is further configured to determine aggregate feedback by aggregating individual feedback from a plurality of subsequent (downstream processing) nodes. For example, the subsequent nodes are nodes that analyze/process output(s) of the node. In some embodiments, in accordance with a determination that an entropy of the set of input signals does not converge, the node is connected to one or more additional nodes of a prior processing stage. In some embodiments, in accordance with a determination that respective input signals from one or more nodes of a prior processing stage are not statistically relevant (e.g., have a relevance below a threshold relevance value), connections between the one or more nodes and the node are removed (e.g., transitioning the connection state from awake to dormant). In some embodiments, each node of the set of nodes is configured to forward propagate a two-dimensional vector consisting of a directional value and a weight value. For example, the weight value may be in a range from zero to a sampling threshold (e.g., a sampling limit). In some embodiments, each node of the set of nodes is configured to backwards propagate a two-dimensional feedback vector consisting of a directional value and an amplitude value. In some embodiments, the feedback vector is filtered by agreement and the filtered feedback is used to derive/update a weight value for a corresponding connection. In some embodiments, each node in the set of nodes has a node type selected from a group consisting of a standard node, a sensor node, and a label node. In some embodiments, each node of the set of nodes has a node state indicating one or more of the following: an activation threshold, a noise expectation, an ingress entropy mean, an ingress entropy variance, an ingress state, an egress entropy mean, an egress entropy variance, and an egress state.

The system receives (106), from the probabilistic machine-learning model, a response that was generated based on approximate probability distributions (e.g., PDRs) identified by the probabilistic machine-learning model in response to the information about the user query. In some embodiments, the probabilistic machine-learning model receives inputs that include the information about the user query and context information and generates an inference based on the received inputs. In some embodiments, the approximate probability distributions are a set of Gaussian distribution representations. In some embodiments, the approximate probability distributions are generated in part by identifying and combining a set of complementary distributions. In some embodiments, the approximate probability distributions are generated using a non-biased estimator. In some embodiments, each approximate probability distribution is a non-parametric approximation. In some embodiments, the approximate probability distributions are generated based on a set of inputs and a set of intermediate PDRs, where the set of intermediate PDRs is generated using an independent component analysis.

The system sends (108) information about the response to the user device. For example, the system generates natural language response to the user query based on an inference received from the probabilistic machine-learning model.

In some embodiments, the system is coupled to a plurality of user devices and receives user queries, and supplies responses, to each of the plurality of user devices. In some embodiments, multiple queries are received from a user device and the prior queries (and optionally related context information such as the query responses) are used as context information for responding to the latest query.

FIG. 1B is a block diagram illustrating example operation of an example system for providing inferences in accordance with some embodiments. FIG. 1B shows an operation sequence from (a) to (b) to (c) in which a query 122 is sent from a user device 120 to a computing system 124 and the computing system 124 sends a corresponding response 142 back to the user device 120. In accordance with some embodiments, the computing system 124 includes an input component 126, a model 128, and an output component 136. In some embodiments, the computing system 124 includes only a subset of the components shown in FIG. 1B (e.g., does not include the input component 126 and/or the output component 136). In some embodiments, the model 128 is a probabilistic machine-learning model. The model 128 includes a set of nodes 130 and a set of connections 132. In accordance with some embodiments, the solid line connections in the set of connections 132 indicate active connections (sometimes also referred to as "awake" connections) between nodes and the dashed line connections indicate candidate connections between nodes. In some embodiments, candidate connections may be converted to active connections when the system determines that additional inputs are required to generate an appropriate PDR.

First, in (a), the user device 120 sends the query 122 to the computing system 124. The query 122 is received at the computing system 124 and optionally pre-processed (e.g., by the input component 126). In some embodiments, the pre-processing includes converting from a natural language input to a vector or other type of structured data.

Next, in (b), information about the query 122 is provided to the model 128 and the model 128 processes the information by generating PDRs 140. In some embodiments, the model 128 generates an inference based on an analysis (e.g., an independent component analysis) of the PDRs 140 (e.g., based on PDRs 140-4 and 140-5). In the example of FIG. 1B, information from the PDRs 140-2 and 140-3 is used to generate the PDR 140-4.

Then, in (c), the computing system 124 sends the response 142 to the user device 120. In some embodiments, the response 142 is a natural language response based on an inference from the model 128. In some embodiments, the response 142 is generated at the output component 136 (e.g., a classifier, encoder, or other type of output component). Thus, FIG. 1B illustrates an example of the computing system 124 receiving a user input and using a probabilistic model to generate a response to the user unput.

In some embodiments, the user device 120 is associated with one or more users. In some embodiments, the user device 120 is a personal computer, mobile electronic device, wearable computing device, laptop computer, tablet computer, mobile phone, feature phone, smart phone, infotainment system, digital media player, speaker, television (TV), and/or any other electronic device capable of receiving user inputs and/or presenting information. The user device 120 may connect to each other wirelessly and/or through a wired connection (e.g., directly through an interface, such as an HDMI interface).

Figure 2A:
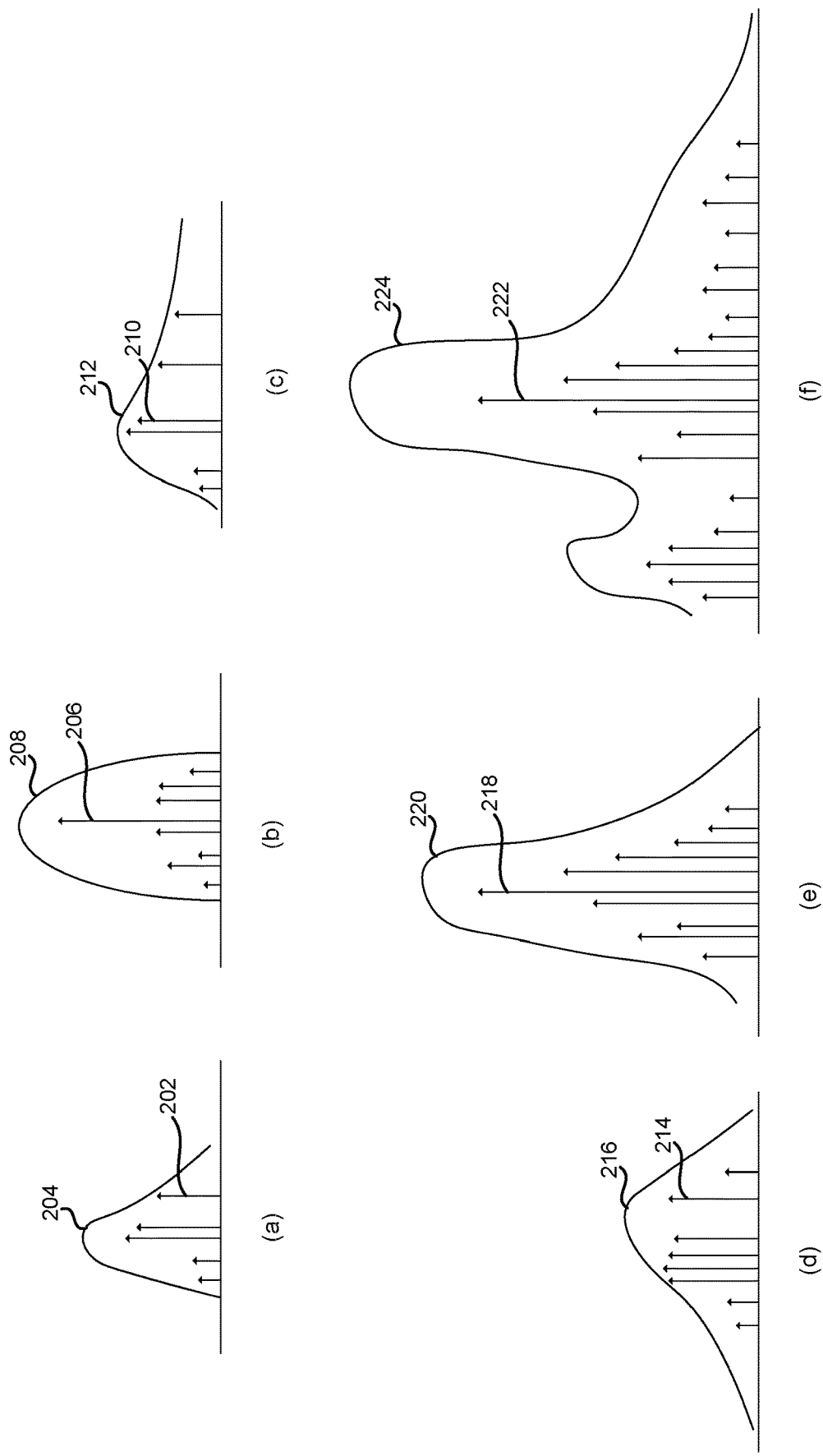
FIG. 2A illustrates example input signals and corresponding output representations in accordance with some embodiments.

FIG. 2A illustrates example input signals and corresponding output representations in accordance with some embodiments. FIG. 2A includes examples (a) through (f) with each example showing a set of input vectors and a corresponding approximate distribution. The input vectors in each example may represent forward propagation (e.g., vectors corresponding to a user query or other type of input) or backward propagation (e.g., vectors corresponding to feedback received from downstream processing nodes). In example (a), approximate distribution 204 is generated for a set of input vectors 202. In example (b), approximate distribution 208 is generated for a set of input vectors 206. In example (c), approximate distribution 212 is generated for a set of input vectors 210. In example (d), approximate distribution 216 is generated for a set of input vectors 214. In example (e), approximate distribution 220 is generated for a set of input vectors 218. In example (f), approximate distribution 224 is generated for a set of input vectors 222. In some embodiments, an entropy of each approximate distribution is used to determine whether additional input information is needed (e.g., additional input to obtain an approximate distribution with higher entropy). In some embodiments, a covariance of each approximate distribution is used to determine whether to decompose the approximate distribution into two or more separate distributions.

In some embodiments, an approximate distribution is determined using conditional probability. For example, Bayes rule may be used, in which a posterior probability (e.g., the updated probability) is equal to a prior probability times the likelihood (e.g., probability of the evidence given the belief is true) divided by the marginal probability (e.g., probability of the evidence under any circumstance). In some embodiments, the approximate distributions are based on Equation 1:

$$P(\text{hypothesis}|\text{evidence}) = P(\text{hypothesis}) \times P(\text{evidence}|\text{hypothesis})/P(\text{evidence}) \quad \text{Equation 1—Conditional Probability}$$

A challenge with using conditional probability in models is determining the evidence aspect (e.g., corresponding to a marginal likelihood). In some embodiments, integrals corresponding to the evidence are approximated using posterior probability (e.g., maximizing expectation). In some embodiments, a surrogate posterior is used to approximate a set of inputs (e.g., input vectors) corresponding to the evidence aspect. For example, at each node in a set of nodes for a model (e.g., the nodes 130), a total energy and variance expectation for the surrogate posterior is dynamically updated based on input data. In some embodiments, an activation threshold and/or noise expectation is derived from the total energy and/or variance expectation of a surrogate posterior. In some embodiments, for signals that don't fit to a surrogate posterior, the node provides corresponding feedback to the connected sources so input connection weights can be adjusted accordingly. For example, the feedback corresponds to a combination of expectation maximization and agreement filtering (e.g., to add context).

In some embodiments, each node of a set of nodes in the model is configured to fit input vectors to a respective Gaussian approximation. In some embodiments, fitting a Gaussian approximation to a set of input vectors includes adjusting a width and/or height of the Gaussian approximation. For example, an adjusted Gaussian approximation with a large width and/or low height may be indicative of a poor approximation (e.g., indicating that additional input vectors with covariate signals may be needed). In some embodiments, the set of nodes is sparsely coupled, and thus different nodes are fitting different inputs to different Gaussian approximation (e.g., corresponding to different independent variables). In some embodiments, model parameters are used to govern how two-dimensional input vectors are converted to probability distributions (e.g., a lower bound for marginal likelihood). For example, the model parameters can govern how the model handles peaks, valleys, skew, and kurtosis in input signals. In some embodiments, a mode may be measured by a first sustained energy area (as opposed to where peaks are located) and a first model parameter (e.g., the mode energy parameter shown in FIG. 12A) governs a mode energy threshold. For example, a mode energy of 65 may be used to determine a directional delta corresponding to 65% of expected energy and variance. In some embodiments, a signal with a corresponding highest connection weight is considered a dominant signal and the mode for the approximation distribution is determined based on the dominant signal. In some embodiments, an aggregate over time of signal modes governs the identification of the mode for the approximation distribution (e.g., a mode expectation). In some embodiments, a second model parameter (e.g., the accept reject bounds parameter shown in FIG. 12A) governs an outlier boundary. For example, an accept reject bound of 15 results in outliers above 15% being treated like 15% outliers.

Figure 2B:
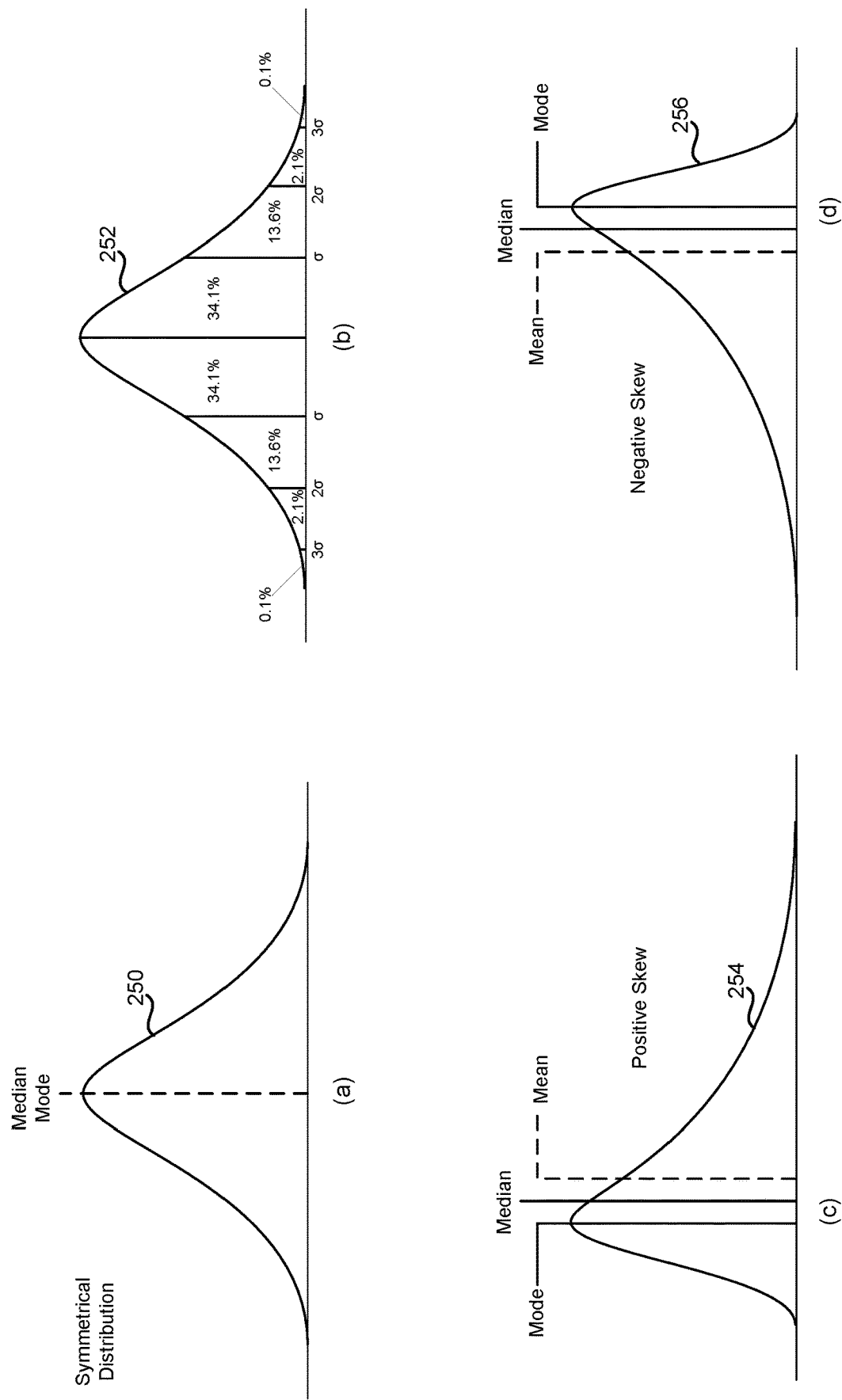
FIG. 2B illustrates example aggregate distributions in accordance with some embodiments.

FIG. 2B illustrates example aggregate distributions in accordance with some embodiments. FIG. 2B includes examples (a) through (d) with each example showing a distribution having particular attributes. In example (a), a distribution 250 is a symmetrical distribution in which the mean, median, and mode are the same. In example (b), a distribution 252 is a symmetrical distribution with 34.1% of the distribution within one sigma (e.g., one standard deviation) of the mean. A higher covariance results in a lower variance distribution (e.g., a narrower distribution) whereas a lower covariance results in a higher variance distribution (e.g., a wider distribution). Examples (c) and (d) show asymmetrical distributions. Distribution 254 in example (c) is an example of a positive skew distribution and distribution 256 in example (d) is an example of a negative skew distribution. In a positive skew distribution, the mode is to the left of the mean and, in a negative skew distribution, the mode is to the right of the mean.

Figure 3A:
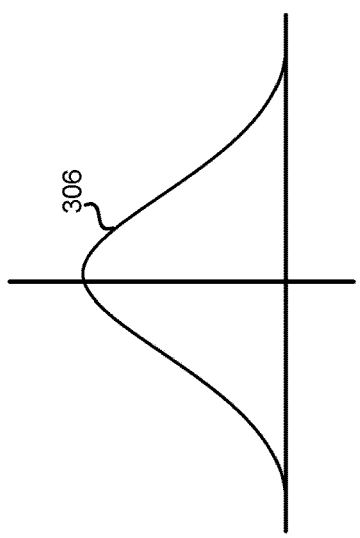
FIGS. 3A and 3B illustrate example combinations of aggregate distributions in accordance with some embodiments.
Figure 3A:
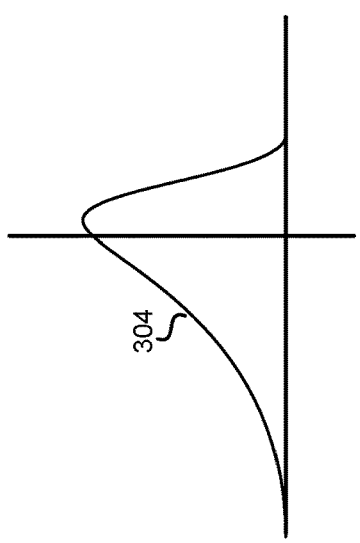
Figure 3A:
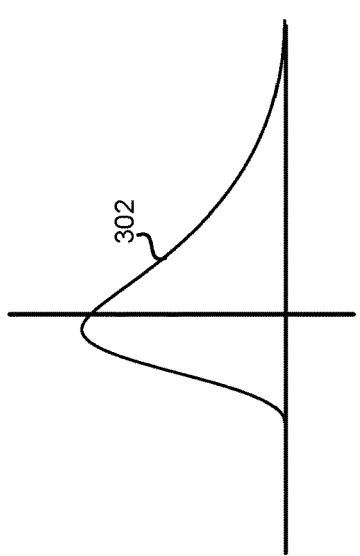
Figure 3B:
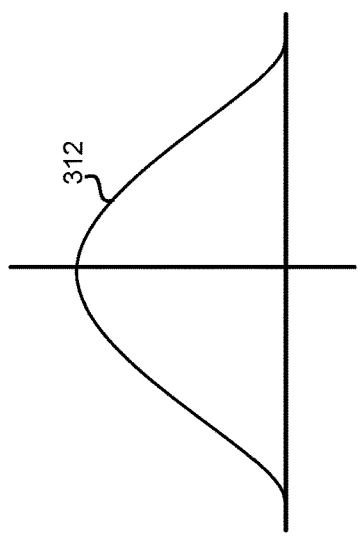
Figure 3B:
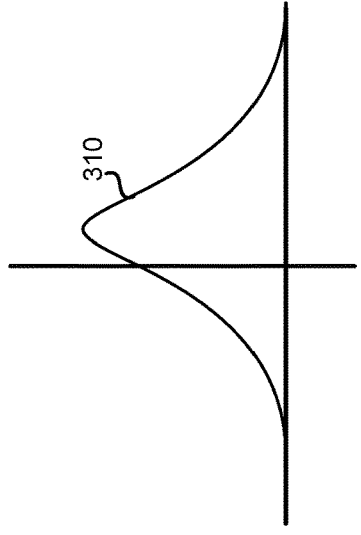
Figure 3B:
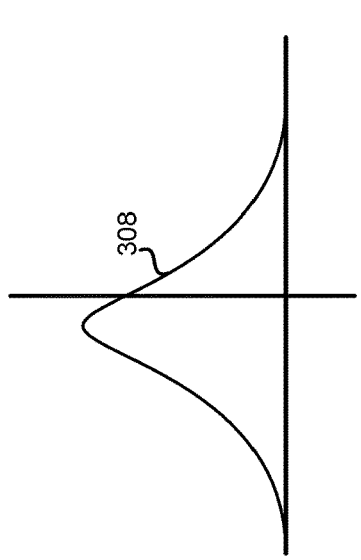

FIGS. 3A and 3B illustrate example combinations of aggregate distributions in accordance with some embodiments. In FIG. 3A, a positive skew distribution 302 is combined with a negative skew distribution 304 to generate a symmetric distribution 306. In FIG. 3B, a symmetric distribution 308 is combined with a symmetric distribution 310 to generate distribution 312. In the example of FIG. 3B, the distributions 308 and 310 correspond to independent variables as indicated by the distribution 312 having a higher standard deviation than the distributions 308 and 310.

Figure 3C:
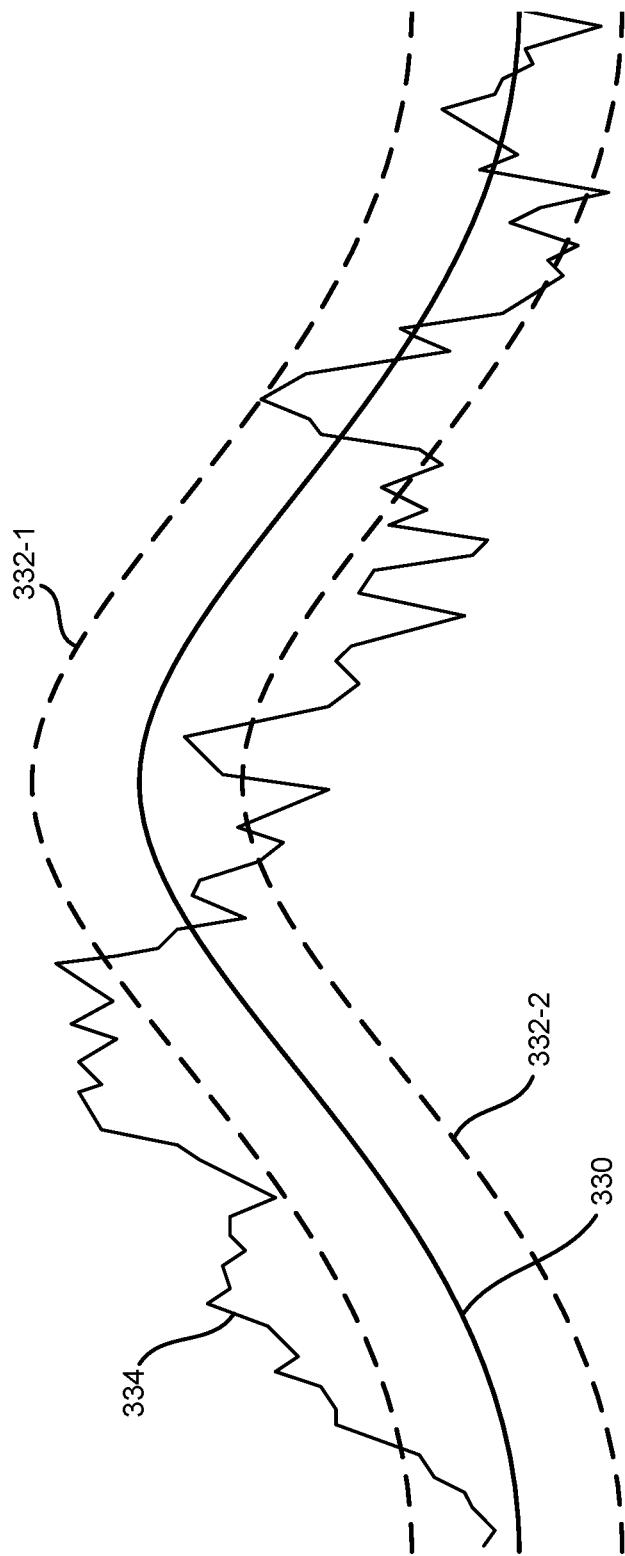
FIG. 3C illustrates an example of entropy convergence in accordance with some embodiments.

FIG. 3C illustrates an example of entropy convergence in accordance with some embodiments. In FIG. 3C, the line 330 indicates a long-term average and the line 334 indicates a corresponding short-term average. The lines 332-1 and 332-2 indicate an expected spread for the long-term average. In some embodiments, in accordance with the short-term average not being within the spread of the long-term average, additional input data is requested (e.g., additional nodes are connected to a particular node to provide additional input data). In some embodiments, a set of source nodes is indicated as being candidates for coupling to new target (downstream) nodes. In some embodiments, source nodes are indicated as being candidates in accordance with feedback from coupled target nodes. For example, source nodes are indicated as being candidates in accordance with feedback indicating that information in the source nodes is not being used by the current set of target nodes (e.g., a percentage of information is unused). In some embodiments, a source node looks for new targets when entropy does not converge (indicating that it has excess energy/information). For example, a Thompson sampling may be used based on beta distribution. In some embodiments, a set of target nodes is indicated as being candidates for coupling to new source (upstream) nodes in accordance with entropy at the target nodes not converging. In some embodiments, source candidate nodes are linked to target candidate nodes (e.g., connections between the nodes are activated). In some embodiments, the source candidate nodes are linked with target candidate nodes during a connection management stage (e.g., between processing sets of data).

Figure 4A:
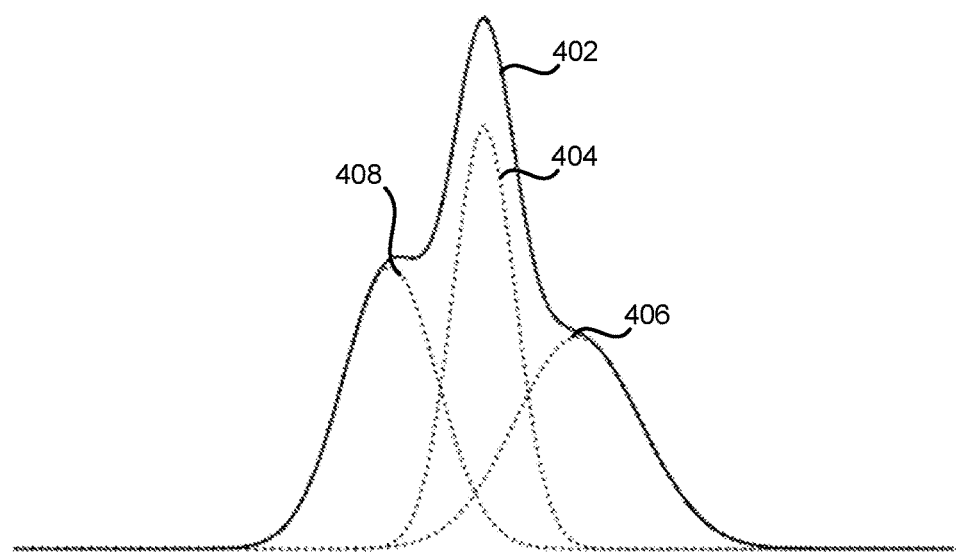
FIG. 4A illustrates an example aggregate distribution in accordance with some embodiments.

FIG. 4A illustrates an example aggregate distribution in accordance with some embodiments. FIG. 4A shows a distribution 402 that represents a combination of distributions 404, 406, and 408. In some embodiments and circumstances, the distribution 402 is decomposed into the distributions 404, 406, and 408. For example, the distribution 402 may be a sufficient approximation to generate an accurate inference in some situations. In some embodiments, whether the distribution 402 is decomposed depends on capacity in the model. In some embodiments, the distribution 402 is generated at an output of a first processing layer of a model and the distributions 404, 406, and 408 are generated at subsequent processing layers of the model.

Figure 4B:
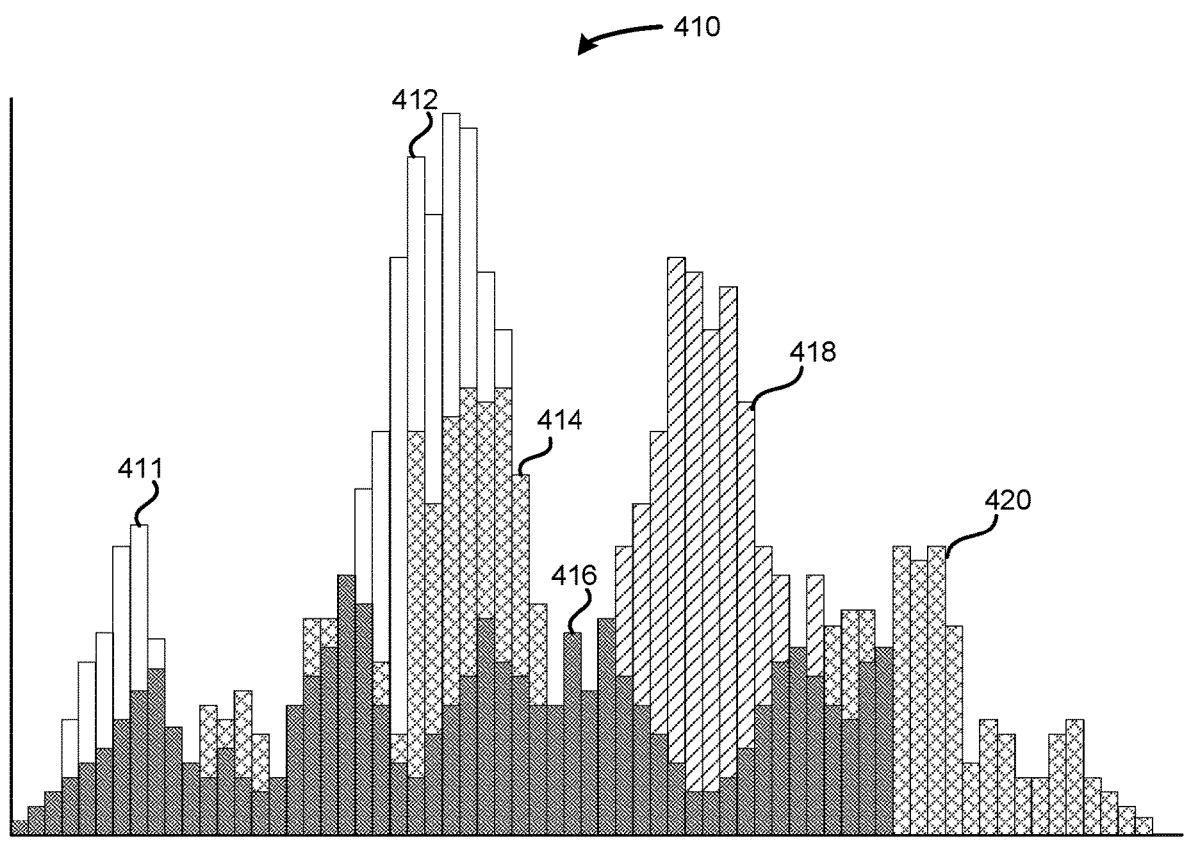
FIG. 4B illustrates an example set of inputs for an example probabilistic model in accordance with some embodiments.

FIG. 4B illustrates an example set of inputs for an example probabilistic model in accordance with some embodiments. The inputs 410 in FIG. 4B correspond to a complex distribution with different data sets 412, 414, 416, 418, and 420. In some embodiments, each data distribution is independent.

Figure 5A:
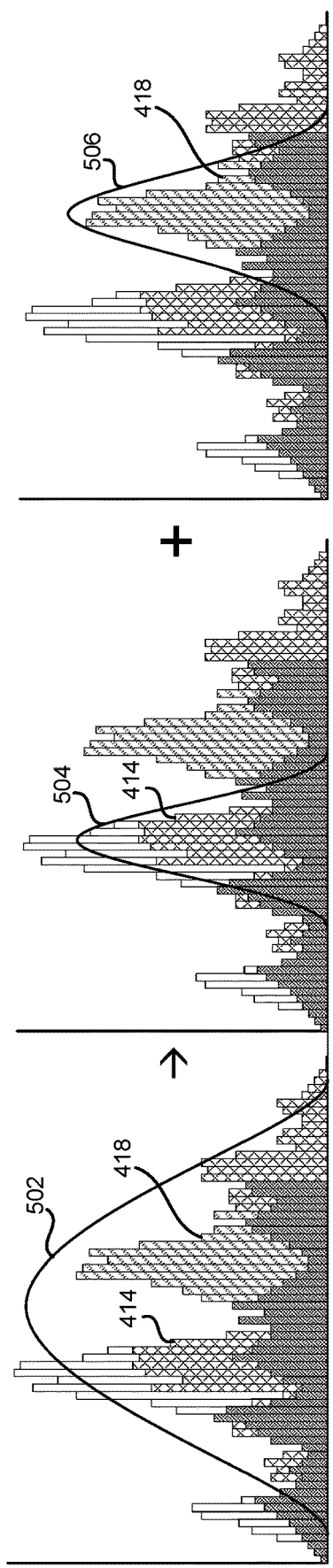
FIGS. 5A and 5B illustrate example aggregate distributions and example decomposition in accordance with some embodiments.
Figure 5B:
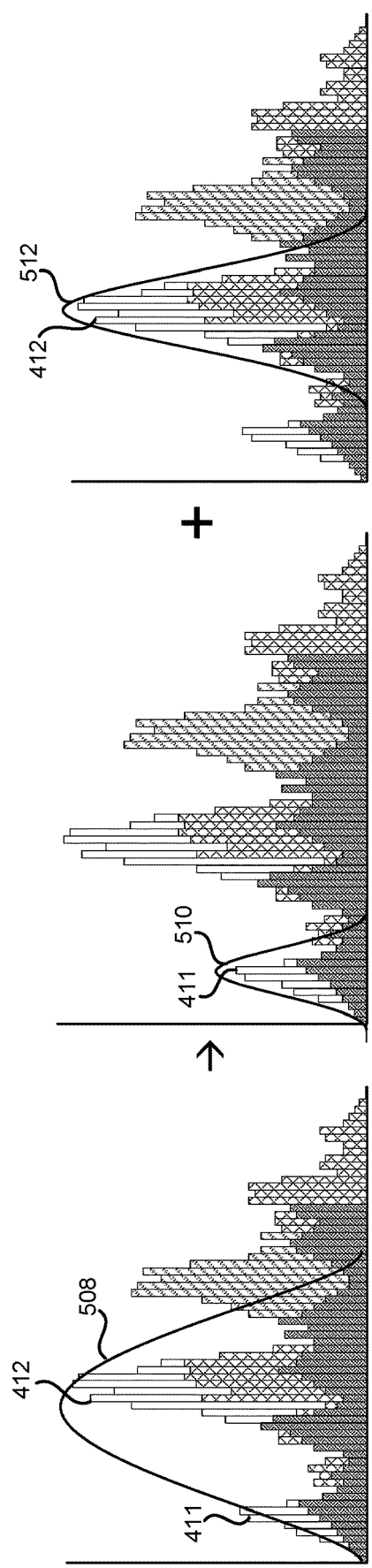

FIGS. 5A and 5B illustrate example aggregate distributions and example decomposition in accordance with some embodiments. FIG. 5A shows a distribution 502 corresponding to data sets 414 and 418 decomposed into a distribution 504 corresponding to data set 414 and a distribution 506 corresponding to data set 418. As illustrated in FIG. 5A, the distributions 504 and 506 have smaller standard deviations than the distribution 502. FIG. 5B shows a distribution 508 corresponding to data sets 411 and 412 decomposed into a distribution 510 corresponding to data set 411 and a distribution 512 corresponding to data set 412. As illustrated in FIG. 5B, the distributions 510 and 512 have smaller standard deviations than the distribution 508.

Figure 6:
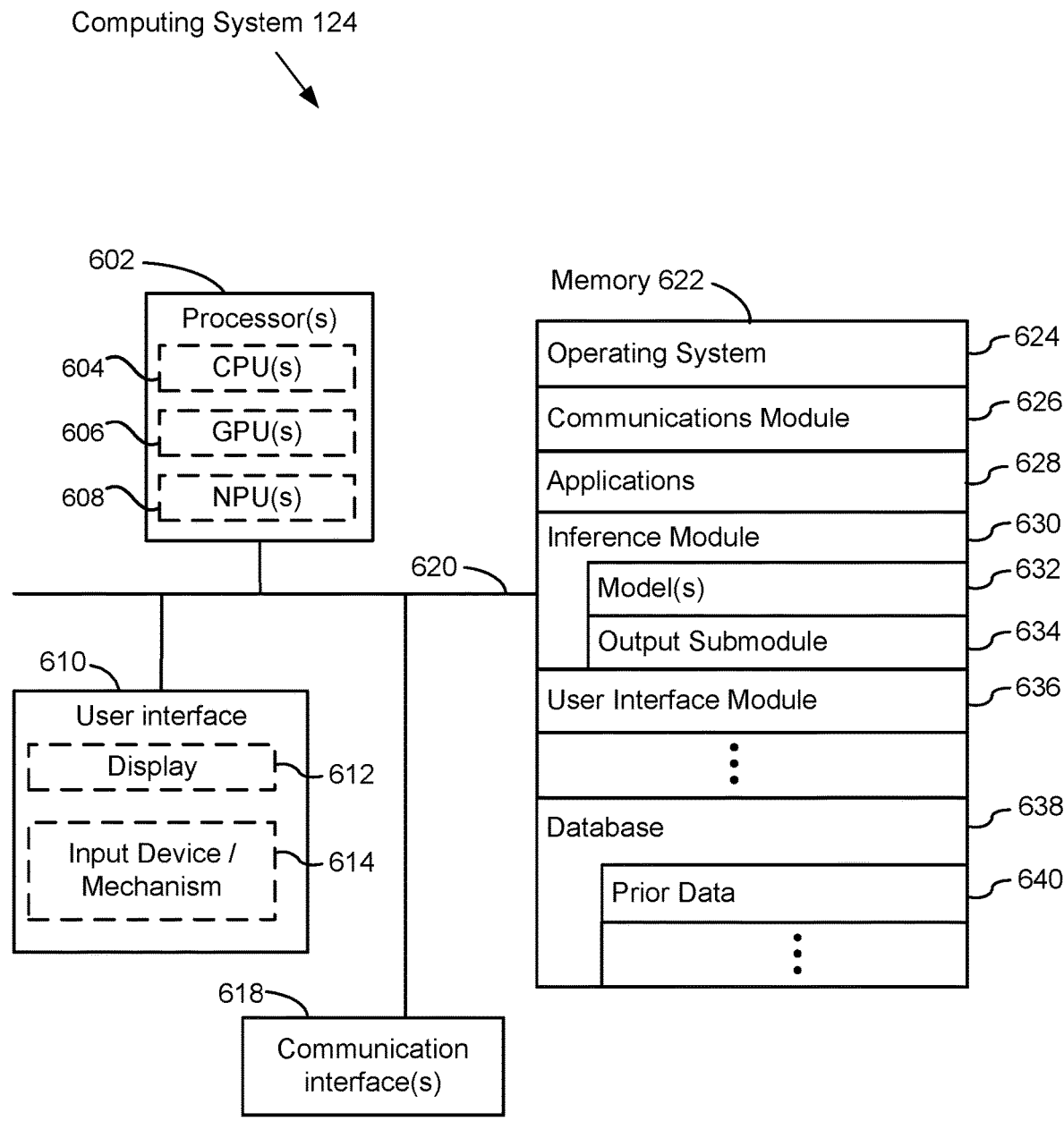
FIG. 6 is a block diagram illustrating an example computing system in accordance with some embodiments.

FIG. 6 is a block diagram illustrating the computing system 124 in accordance with some embodiments. The computing system 124 includes one or more processors 602, a user interface 610, one or more communication interfaces 618 (e.g., network interfaces), memory 622, and one or more communication buses 620 for interconnecting these components. In some embodiments, the processor(s) 602 include one or more CPUs 604, one or more GPUs 606, and/or one or more NPUs 608. In some embodiments, the computing system 124 includes one or more controllers or other control logic (e.g., in addition to the processor(s) 602). In some embodiments, the CPU(s) 604 are configured to perform operations related to the operating system 624, the communications module 626, the user interface module 636, and/or the applications 628. In some embodiments, the GPU(s) 606 and/or the NPU(s) 608 are configured to perform operations related to the inference module 630. In some embodiments, the user interface 610 includes an output device and/or mechanism (e.g., a display 612) and/or an input device or mechanism 614 (e.g., a keyboard, a mouse, controller, and/or other type of input device).

The memory 622 includes high-speed random-access memory, such as DRAM, SRAM, DDR RAM, or other random access solid-state memory devices, and may include non-volatile memory, such as one or more magnetic disk storage devices, optical disk storage devices, flash memory devices, or other non-volatile solid-state storage devices. The memory 622 optionally includes one or more storage devices remotely located from one or more processors 602. The memory 622, or, alternatively, the non-volatile solid-state memory device(s) within the memory 622, includes a non-transitory computer-readable storage medium. In some embodiments, the memory 622, or the non-transitory computer-readable storage medium of the memory 622, stores the following programs, modules and data structures, or a subset or superset thereof:

- an operating system 624 that includes procedures for handling various basic system services and for performing hardware-dependent tasks;
- a communications module 626 that is used for connecting the computing system 124 to other computing devices via the one or more communication interfaces 618 (wired or wireless);
- one or more applications 628 for performing various functions with respect to providing and managing services;
- an inference module 630 for providing inferences (e.g., in response to user inputs received via the user interface 610 and/or the communication interface(s) 618). In some embodiments, the inference module 630 is configured to provide natural language outputs;
  - one or more models 632 for generating inferences in response to inputs (e.g., in response to user queries). In some embodiments, the model(s) 632 include a probabilistic machine-learning model; and
  - an output submodule 634 for processing/formatting outputs of one or more models (e.g., the model(s) 632). In some embodiments, the output submodule 634 comprises a classifier (e.g., that categorizes data into one or more classes), a regression component (e.g., a linear regression component), an encoder, and/or other types of output submodules. In some embodiments, the output submodule 634 is coupled to one or more outputs of the model(s) 632. In some embodiments, the output submodule 634 comprises a final layer of the model(s) 632 (e.g., an output/label layer);
- a user interface module 636 for processing inputs received via the user interface 610 and for generating outputs to be presented via the user interface 610; and
- a database 638 for handling the storage of and/or access to data and/or metadata relating to the data. In some embodiments, the database 638 is used by the one or more applications 628 and/or the inference module 630. In some embodiments, the database 638 includes:
  - prior data 640 corresponding to prior operation of the inference module 630 (e.g., corresponding to previously-submitted user queries). In some embodiments, the prior data 640 comprises context data for the inference module 630.

In some embodiments, the computing system 124 includes one or more web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in the memory 622 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. For example, the inference module 630 does not include the output submodule 634 in some embodiments. In some embodiments, the memory 622 stores a subset or superset of the respective modules and data structures identified above. In some embodiments, the memory 622 stores one or more sets of model parameters (e.g., weights, thresholds, and/or expectations) and one or more model states. For example, in some embodiments, the memory 622 includes a security module not shown in FIG. 6. The memory 622 optionally stores additional modules and data structures not described above. In some embodiments, the inference module 630 includes a natural language submodule (e.g., for parsing and/or generating natural language strings).

Although FIG. 6 illustrates the computing system 124, in accordance with some embodiments FIG. 6 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. In some embodiments, the database 638 is stored on devices that are remote from the processor(s) 602. In some embodiments, at least a portion of the database 638 is stored on a device that is accessed by the computing system 124. The actual number of servers used to implement the computing system 124, and how features are allocated among them, will vary from one implementation to another and, optionally, depends in part on the amount of data traffic that the computing system handles during peak usage periods as well as during average usage periods.

Figure 7A:
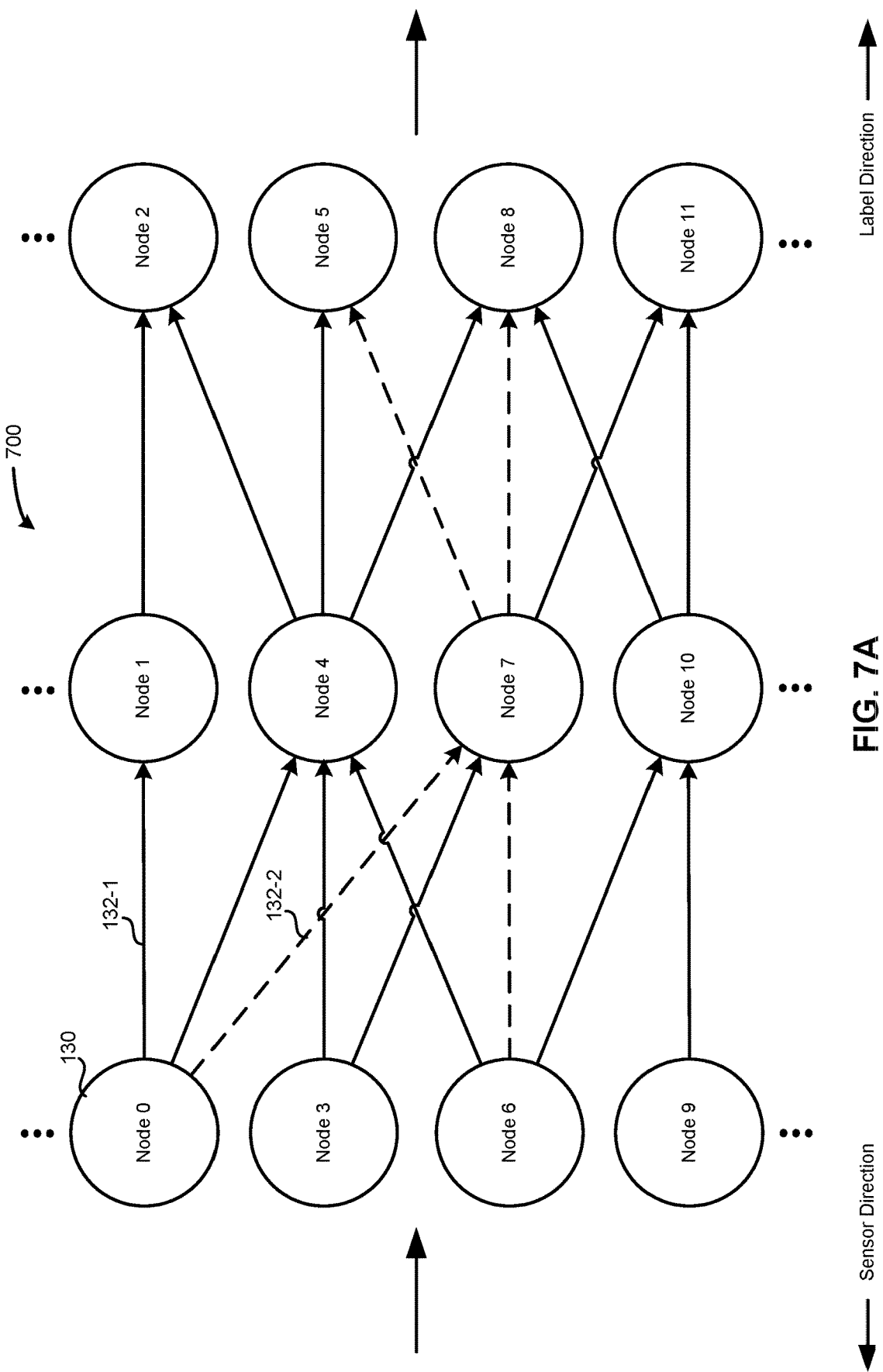
FIGS. 7A and 7B illustrate example model architecture in accordance with some embodiments.
Figure 7B:
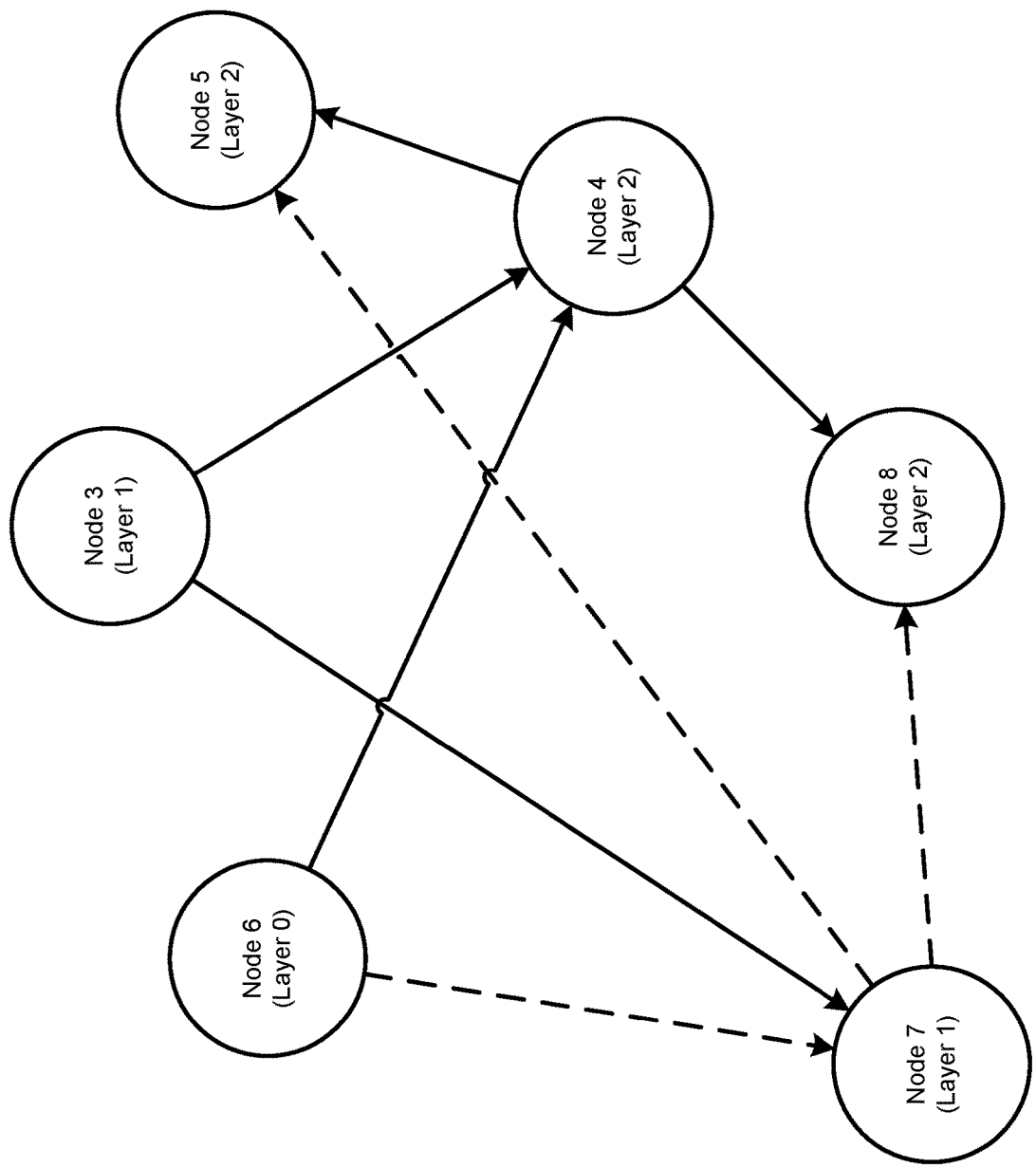

FIGS. 7A and 7B illustrate a model architecture 700 in accordance with some embodiments. FIG. 7A shows the model architecture 700 including the set of nodes 130 (including node 0 through node 11) and the set of connections 132 (including connections 132-1 and 132-2). In the example of FIG. 7A, the solid lines (e.g., connection 132-1) indicate active connections and the dashed lines (e.g., connection 132-2) indicate candidate connections. FIG. 7B illustrates a subset of the nodes 130 along with indication of the virtual layers of nodes. In the example of FIG. 7B, node 6 is in a first processing layer (e.g., virtual layer 0), nodes 7 and 3 are in a second processing layer (e.g., virtual layer 1), and nodes 4, 5, and 8 are in a third processing layer (e.g., virtual layer 2). In some embodiments, the nodes are included in particular layers based on previous processing performed by the model (e.g., learned associations). In some embodiments, each node 130 that is not in an input layer maintains a sparse (e.g., minimum) set of connections to nodes in a prior layer (e.g., a set of connections sufficient to generate an approximate distribution meeting one or more preset parameters). In some embodiments, the model architecture 700 includes a sparse network of nodes (rather than a dense network) that has fewer than the possible maximum number of links within the network. For example, the sparse network of nodes has less than 20%, 10%, 5%, or 1% of the possible maximum number of links. For example, excessive connections (e.g., irrelevant and/or duplicative connections) are trimmed and new connections are activated as needed (e.g., a candidate connection is selected to become active). In some embodiments, nodes in each virtual layer operate in parallel (e.g., the nodes in each virtual layer concurrently generate approximate PDRs to be used in a subsequent virtual layer).

Figure 8:
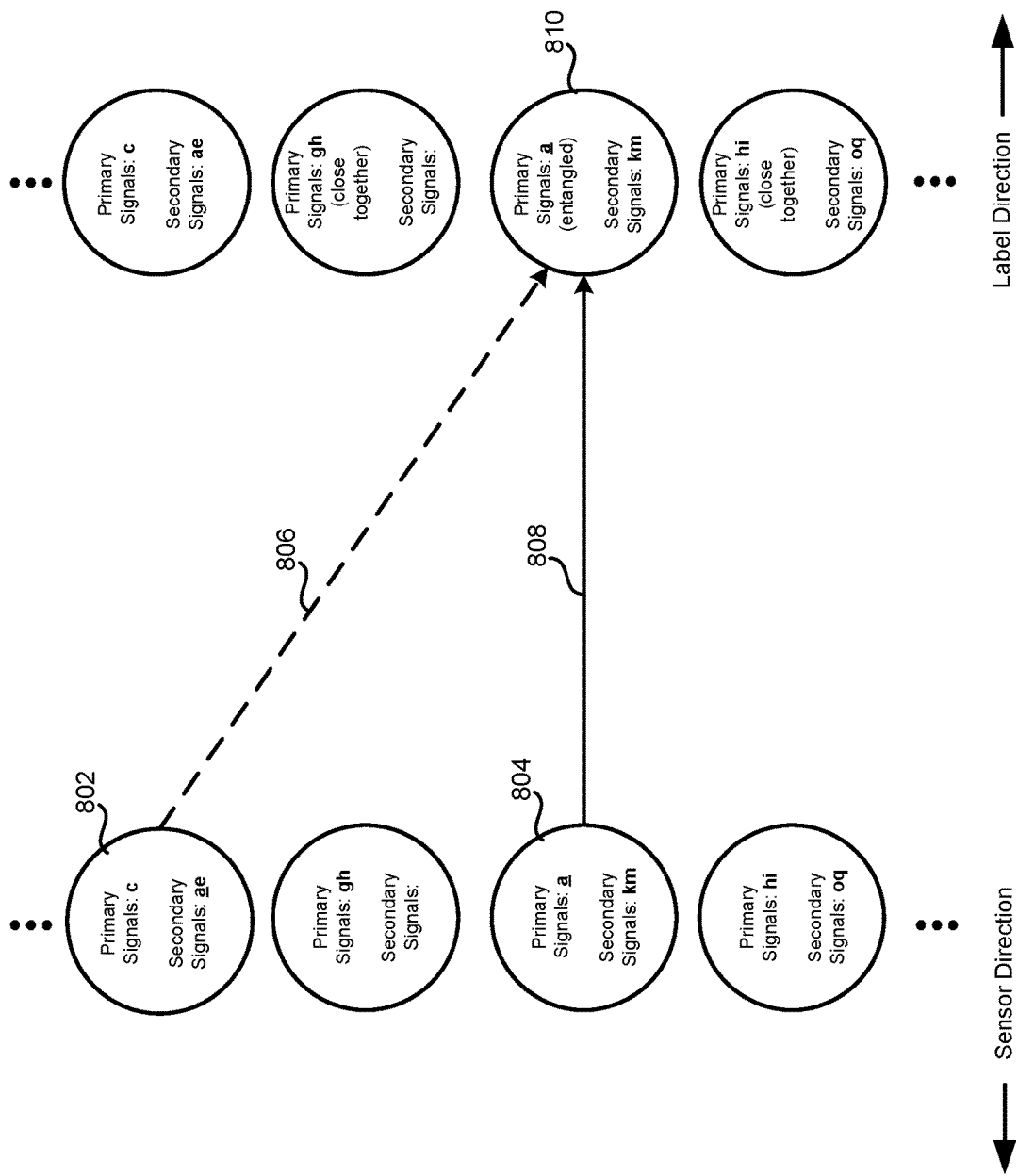
FIGS. 8 and 9A-9B illustrate examples of signal processing within the example model architecture in accordance with some embodiments.
Figure 9A:
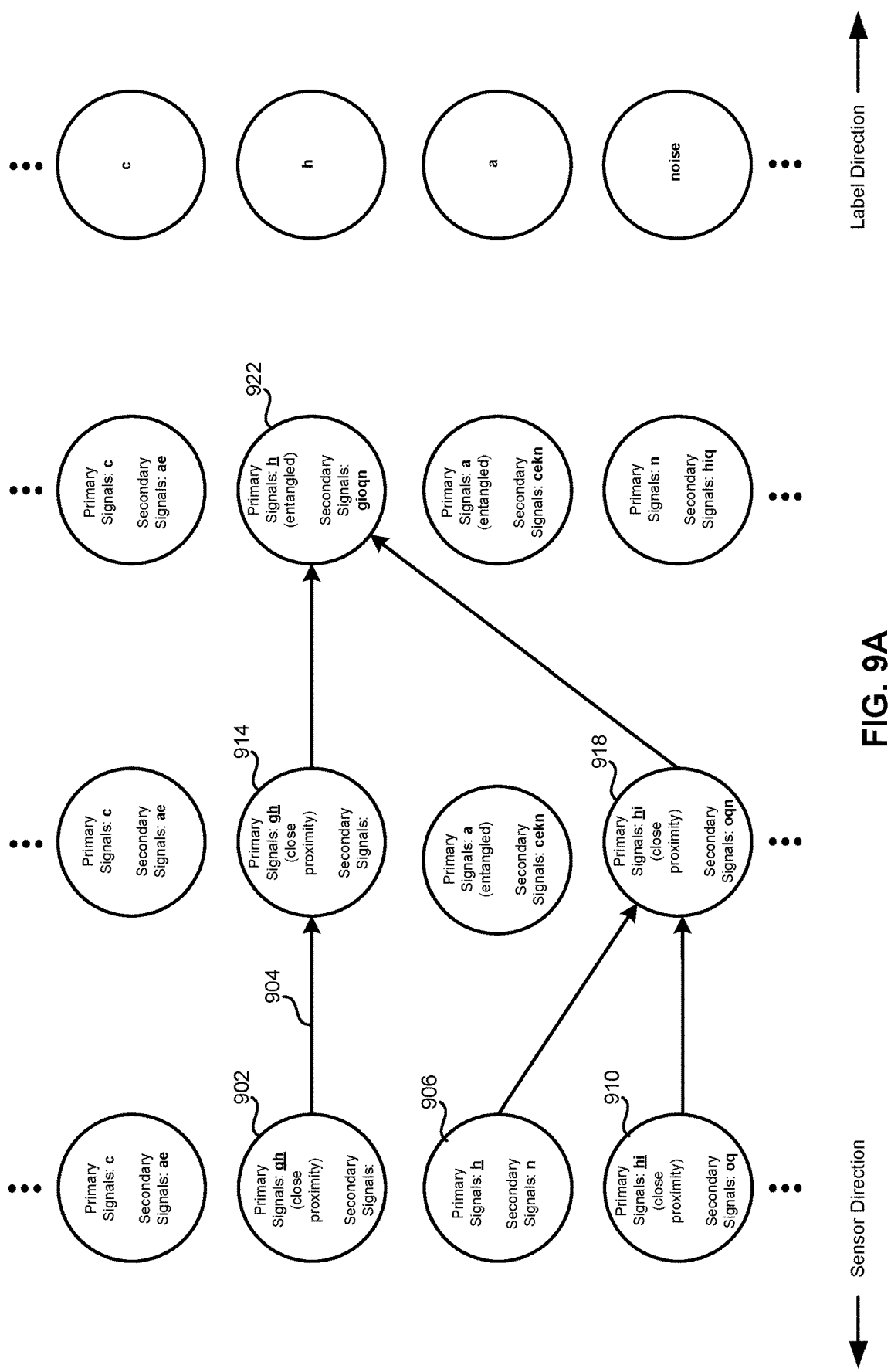
Figure 9B:
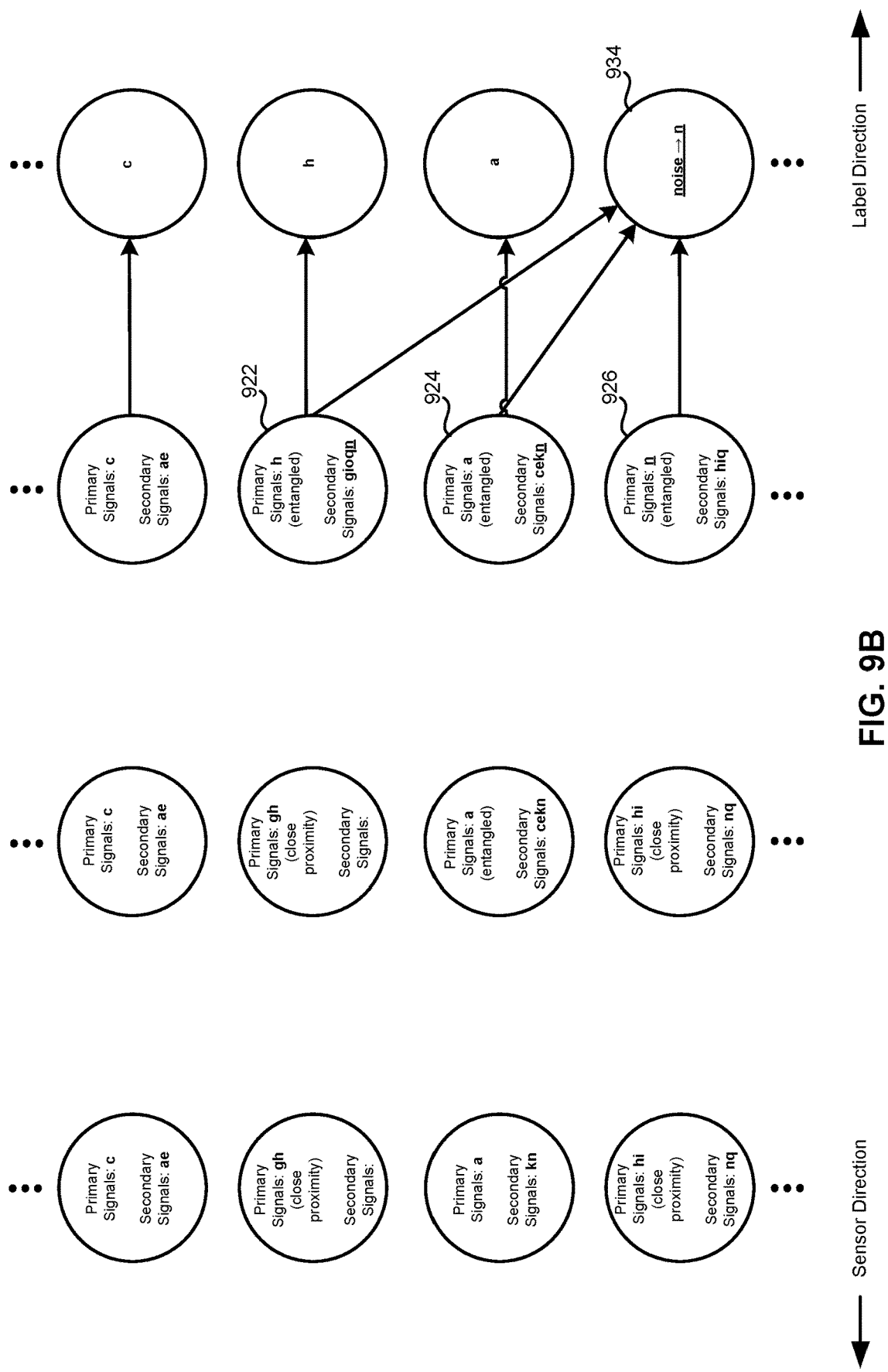

FIGS. 8 and 9A-9B illustrate examples of signal processing within the example model architecture in accordance with some embodiments. FIG. 8 shows an example in which a set of nodes is processing data. Each letter in FIG. 8 represents an input distribution with adjacent alphabets being similar but distinct from one another. For example, the distribution 402 in FIG. 4A may be represented by signals "a," "b," and "c" where "a" corresponds to distribution 408, "b" corresponds to distribution 404, and "c" corresponds to distribution 406. In the example of FIG. 8, each node has separated its data into a set of primary signals and a set of secondary signals. For example, node 802 has identified a primary signal "c" and secondary signals "a" and "e," and node 804 has identified primary signal "a" and secondary signals "k" and "m." Node 810 in FIG. 8 combines the secondary signal "a" from the node 802 (e.g., received via candidate connection 806) with the primary signal "a" from the node 804 (e.g., received via active connection 808). The other signals from the nodes 802 and 804 are maintained as secondary signals "c," "e," "k," and "m" in the node 810. The term "entangled" in FIG. 8 indicates that similar signals are combined to form a new primary component signal. FIG. 8 illustrates a simple example with two connections. In some embodiments, the model architecture includes multiple connections from each node (e.g., hundreds or thousands of connections to downstream processing nodes). In some embodiments, inputs to a node are combined based on similarity to generate corresponding approximate aggregate distributions. In some embodiments, the model (e.g., a node of the model) is configured to determine activation direction based on mode energy compared to expected energy and/or spread.

FIG. 9A illustrates an example of signal processing within the example model architecture. In the example of FIG. 9A, the primary signal "gh" from node 902 is transmitted to node 914 via connection 904. In this example, two letters near one another, such as "g" and "h," represent signals in close proximity. Primary signal "h" from node 906 and primary signal "hi" from node 910 are combined in node 918, which includes primary signal "hi" and secondary signals "o" (from the node 910), "q" (from the node 910), and "n" (from the node 906). In some embodiments, a node is connected to two or more downstream nodes. In some embodiments, a node transmits a first subset of data to a first downstream node and transmits a second subset of data to a second downstream node. FIG. 9A further shows the nodes 914 and 918 transmitting data to node 922. The node 922 in FIG. 9A identifies primary signal "h" and separates signal "g" to a secondary signal. FIG. 9B illustrates example signal processing that is subsequent to the signal processing illustrated in FIG. 9A. In FIG. 9B, nodes 922, 924, and 926 transmit signals to node 934. The node 934 identifies primary signal "n" from the transmitted signals. In the example of FIG. 9B, the node 934 previously had not identified a useful signal (e.g., only noise). In some embodiments, each node propagates a forward vector (e.g., with two data points, such as direction and weight). For example, an active source node passes its activation direction and connection weight to each of its connected target nodes. In some embodiments, based on the primary signal, each secondary signal is classified as either a signal (e.g., requiring further processing) or noise (e.g., not requiring further processing). For example, if there is no matchup between the primary component direction and the direction of the downstream node, the signal information may be maintained as a secondary signal to be considered/identified during later processing when sufficient capacity is available. Activations with lower noise pass more energy and connection mappings become more optimized down the layer. In this way, the distributions from signals overlap less and signals become more independent.

Figure 10A:
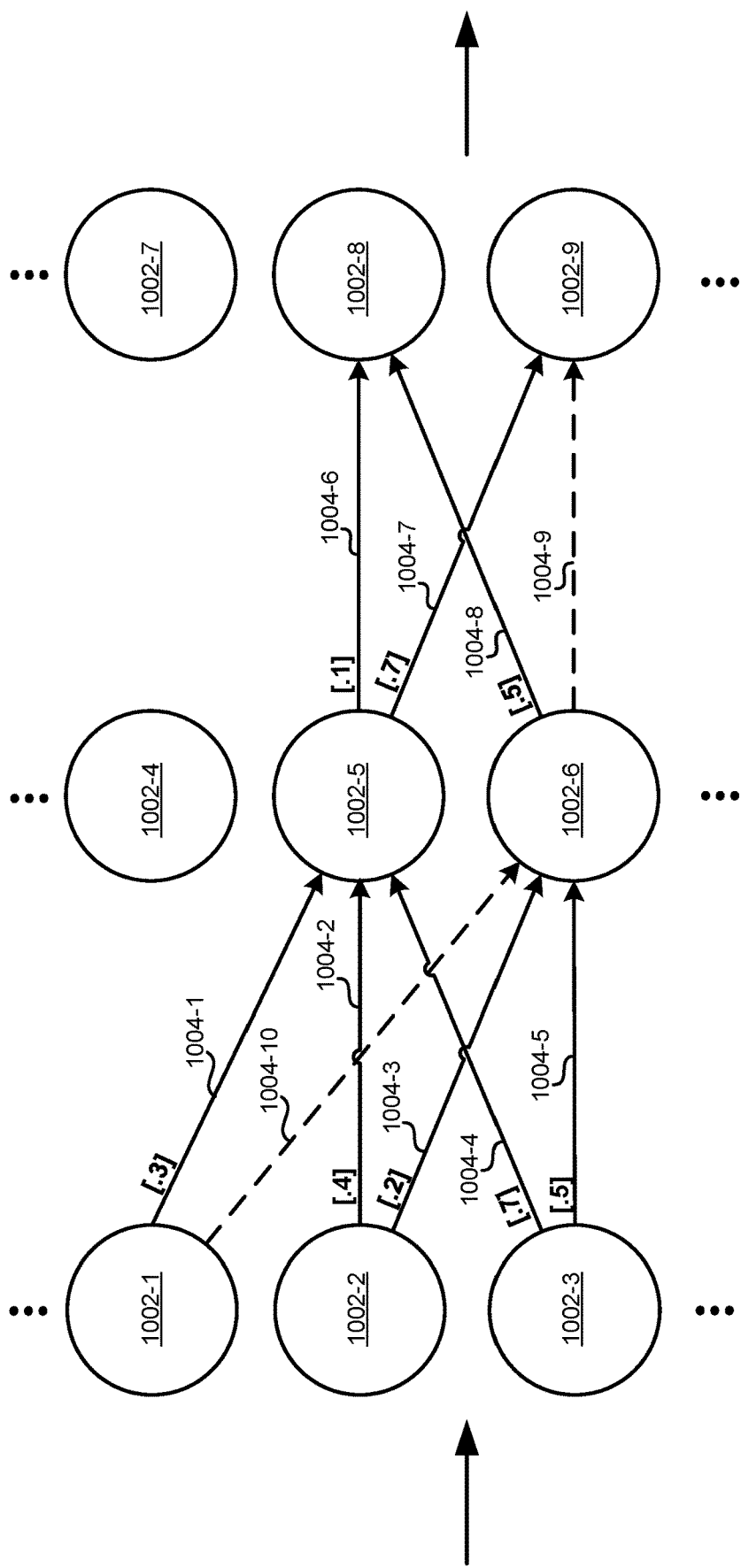
FIGS. 10A-10D illustrate examples of feedback within the example model architecture in accordance with some embodiments.

FIGS. 10A-10D illustrate examples of feedback within the example model architecture in accordance with some embodiments. FIG. 10A illustrates a first state of the model in which nodes 1002 are sparsely connected via connections 1004. The connections 1004 include active connections 1004-1 through 1004-8 and candidate connections 1004-9 and 1004-10. The active connections each have an associated connection weight. For example, the connection 1004-1 has an associated connection weight of 0.3, the connection 1004-2 has an associated connection weight of 0.4, the connection 1004-3 has an associated connection weight of 0.2, and the connection 1004-5 has an associated connection weight of 0.5.

Figure 10B:
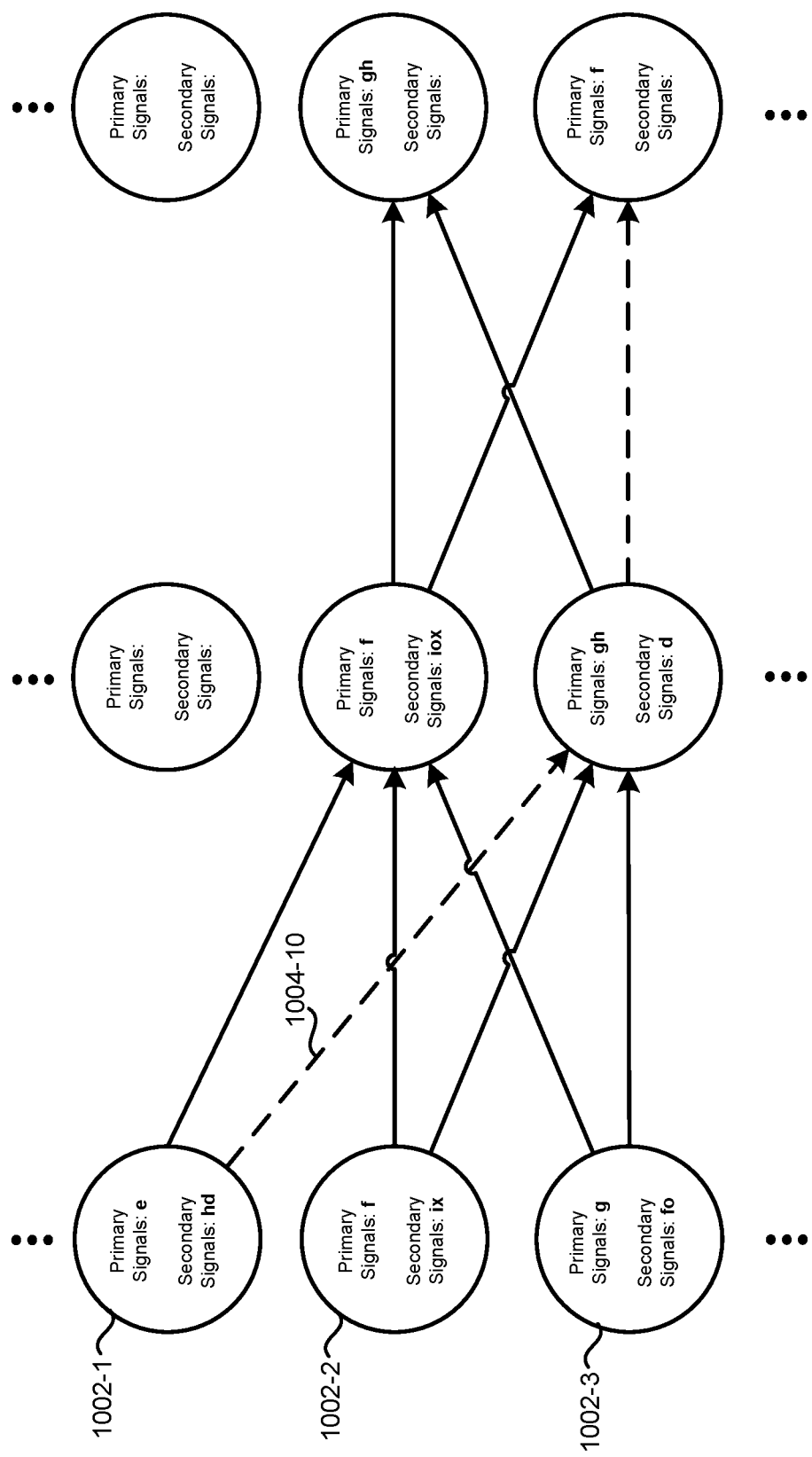
Figure 10C:
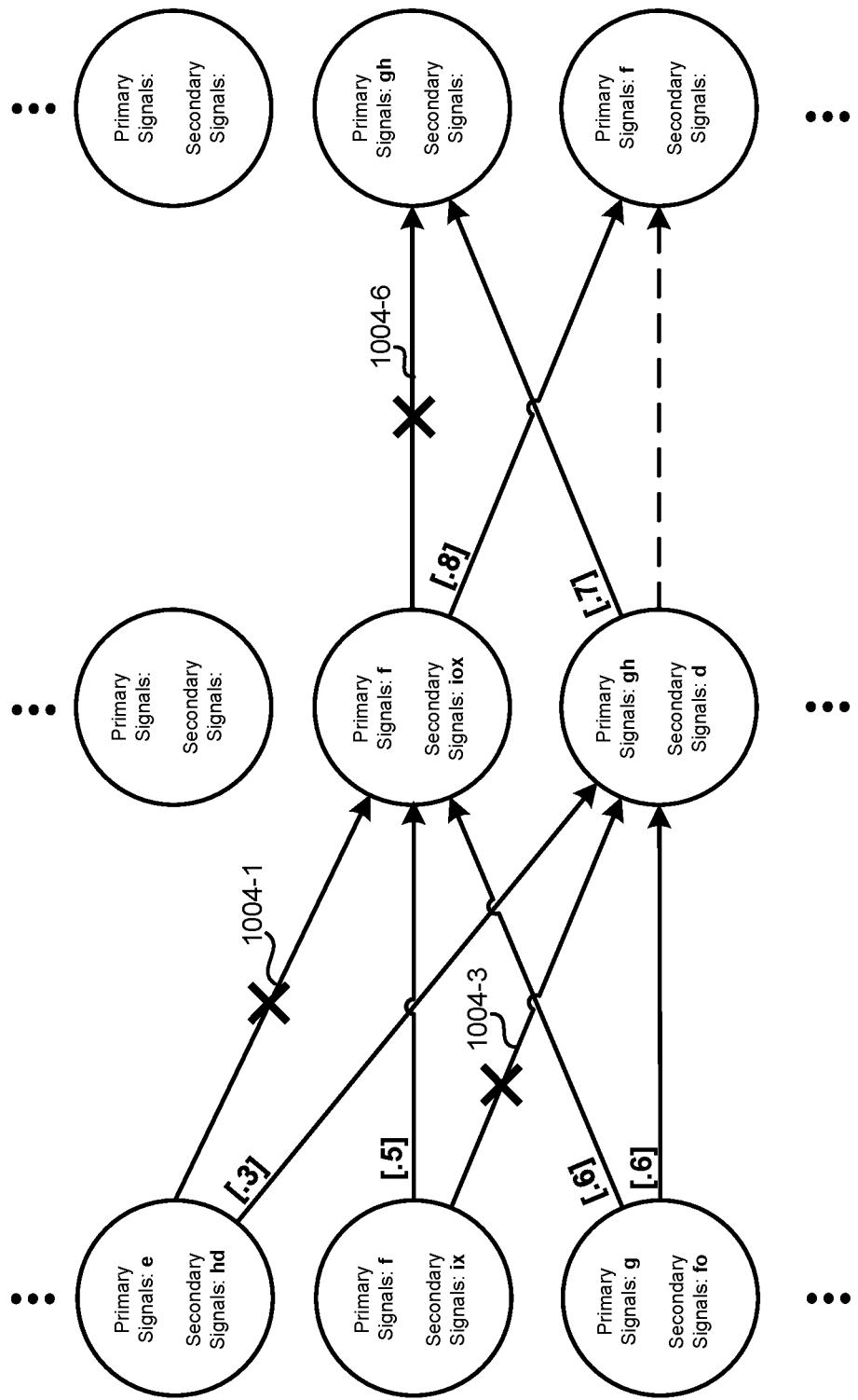
Figure 10D:
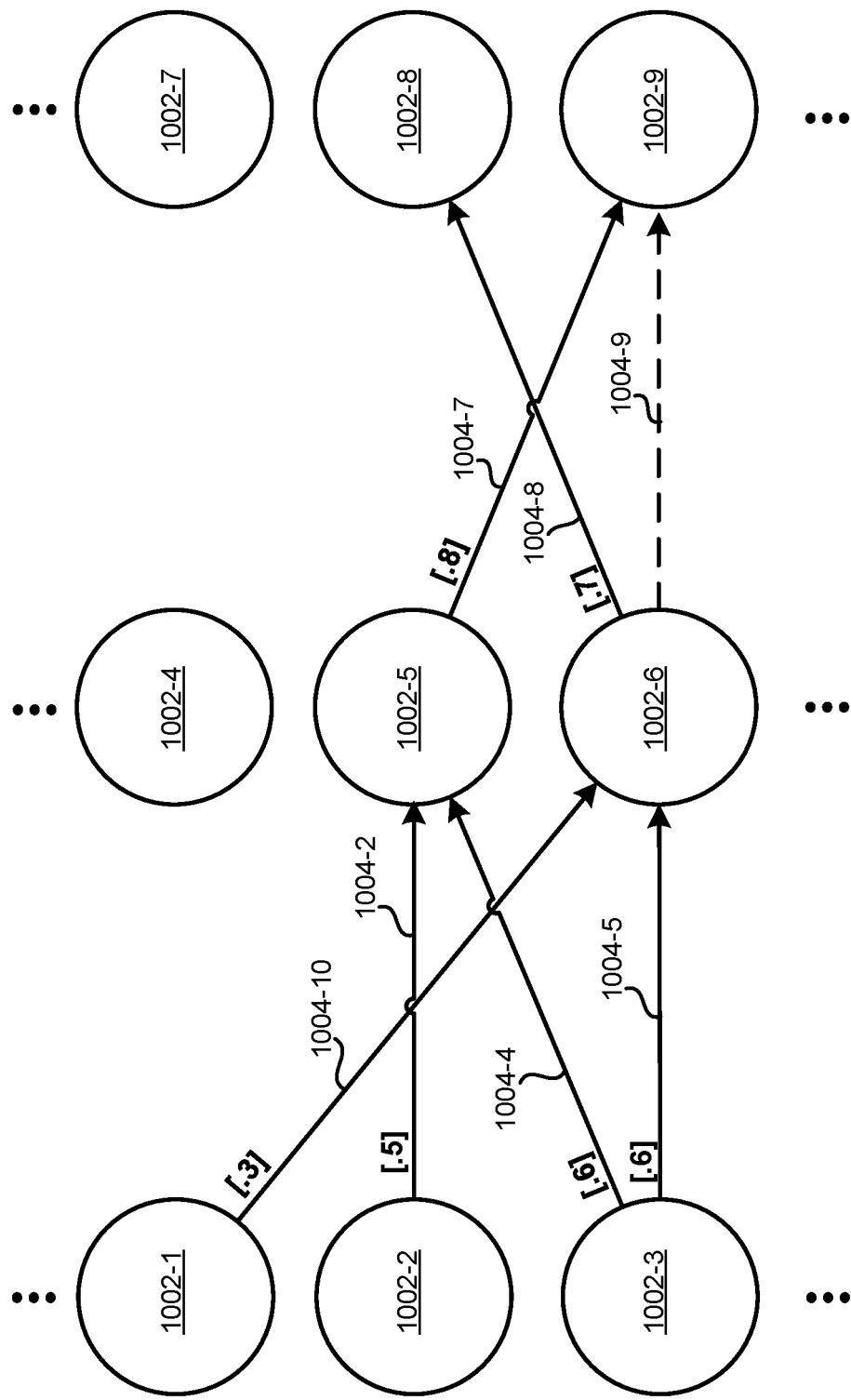

FIG. 10B illustrates example data processing within the model architecture. In the example of FIG. 10B, signals are processed using the preexisting connections 1004 shown in FIG. 10A. FIG. 10C illustrates updates to the connections 1004 (e.g., based on feedback generated by processing the signals received in FIG. 10B). In FIG. 10C, the connections 1004-1, 1004-3, and 1004-6 are removed (deactivated) and the connection 1004-10 is activated (e.g., converted from a candidate connection to an active connection). Additionally, in FIG. 10C, weights associated with the active connections are updated (e.g., based on feedback generated by processing the signals received in FIG. 10B). FIG. 10D illustrates the state of the connections 1004 after the connections are updated as illustrated in FIG. 10C. For example, the connection 1004-2 has an associated weight of 0.5 in FIG. 10D as compared to the associated weight of 0.4 in FIG. 10A. In FIG. 10D, the connection 1004-10 is an active connection with an associated weight of 0.3 as compared to FIG. 10A in which the connection 1004-10 is a candidate connection. In some embodiments, weights are updated based on activation direction, individual feedback information (e.g., filtered by agreement relevance), and/or aggregate feedback information. For example, a weight may be updated based on an aggregate gradient combined with an individual gradient for a given direction. As an example, weights may be updated based on mutual information shared between a node and its downstream nodes.

In some embodiments, the model (e.g., a node of the model) determines a feedback amplitude based on noise (e.g., a lower noise corresponds to a higher amplitude). In some embodiments, the model (e.g., a node of the model) updates an expectation and egress entropy based on feedback data. In some embodiments, the model (e.g., a node of the model) filters received feedback based on agreement and generates aggregate feedback. In some embodiments, the model (e.g., a node of the model) generates a gradient based on feedback (e.g., the aggregate feedback and individual feedback). In some embodiments, the model (e.g., a node of the model) updates an agreement, weight, and/or egress entropy based on the individual and/or aggregate feedback. In some embodiments, the model updates one or more network connections based on received feedback. For example, the model (i) converts one or more connections from an inactive state to a candidate state, (ii) converts one or more candidate connections to an active state, and/or (iii) converts one or more active connections to an inactive state.

In this way, the model illustrated in FIGS. 10A-10D is configured to learn online (e.g., without requiring offline training). For example, the model learns to fit toward a state of equilibrium. In some embodiments, the model optimizes representation capacity by minimizing inputs to nodes of the model. For example, energy is distributed based on the covariance of direction and the log/high noise of the downstream nodes.

Figure 10E:
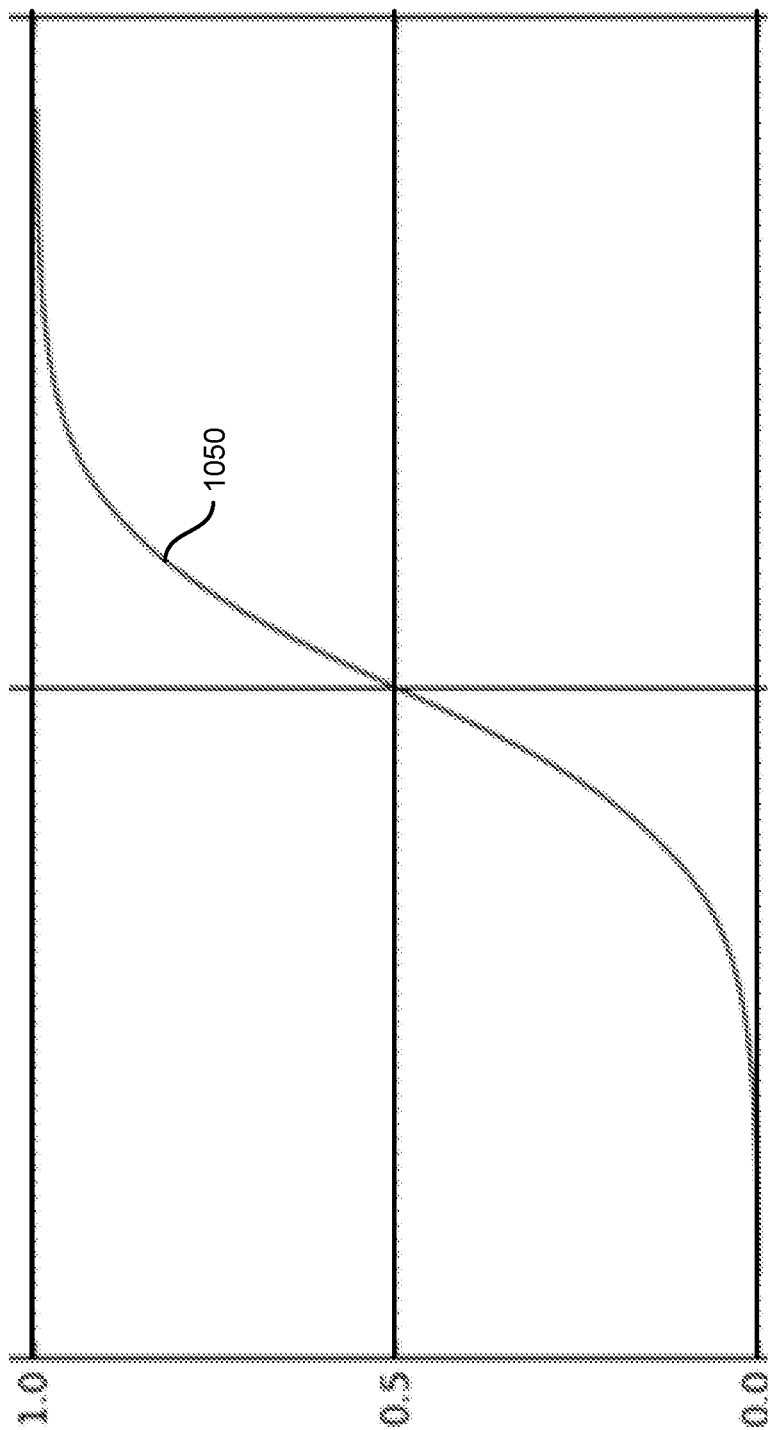
FIG. 10E illustrates an example agreement function in accordance with some embodiments.

FIG. 10E illustrates an agreement function 1050 in accordance with some embodiments. The agreement function 1050 in FIG. 10E is a sigmoid function. In some embodiments, the agreement function 1050 is a different type of function. As discussed above, in some embodiments, feedback from a target node is filtered by an agreement between the source node and the target node. The agreement function 1050 may correspond to one or more nodes of the model. For example, a node may have respective agreement values for each connected downstream node, where the respective agreement values are in a range from 0 to 1 (e.g., excluding the values 0 and/or 1). In some embodiments, feedback from each connected downstream node is combined with (e.g., filtered and/or multiplied by) the respective agreement value. In this way, the agreement function 1050 conceptually represents the conversion of odds to probability. For example, for a given connection between a source node and a target node, if the source node and target node repeatedly agree on direction, the probability moves up the curve toward 1. Conversely, if the source node and target node repeatedly differ on direction, the probability moves down the curve toward 0. The agreement probability reflects recent historical agreement distribution, which allows the model to account for the context while learning. For a given connection, if the source node and the target node agree often, the corresponding high agreement value filters feedback less, which allows the source node and target node to align more strongly (e.g., similar to how biological neurons firing together causes their connections to strengthen).

In some embodiments, a beta distribution function is used as the amount of data varies depending on connections (e.g., 950 out of 1,000 agreement is better than 10 out of 10 agreement). As used herein, a 'beta distribution' refers to a family of continuous probability distributions defined on the interval from 0 to 1 in terms of two positive parameters that control the shape of the distribution. A beta distribution function allows for the history of the current connection state to be accounted for. Each connection may have a different age and amount of historical data in its current state (e.g., due to dynamically changing state between inactive, candidate, and active states). Therefore, determining probability based on the distribution while accounting for history is beneficial over determining simple odds. While a beta distribution may be derived from a series of binary data, its mean and variance can be calculated in closed form by accounting for the number of agreements and number of tries. In some embodiments, activation Gaussian parameters (from a respective source node to a respective target node) are stored and a time step series of activations is calculated from the stored parameters.

In some embodiments, each connection state has a different expectation on the corresponding size of the history window. For example, an awake connection may have a longer window than a candidate connection. In some embodiments, a dormant connection does not have an agreement parameter (e.g., transitioning to a dormant state resets the agreement parameter). In some embodiments, in response to filling a history window, the number of agreements and the number of tries are pared down (e.g., maintaining the same odds).

In some embodiments, a determination as to whether a binary input is in agreement is based on a spread expectation of the source node. For example, if the spread expectation is narrow, then the directional difference between the source node and the target needs to be closer for their directions to be considered to be in agreement. This biasing of low variance (narrow) source signals to the targets with closer directional agreements improves the model's signal independence, which allows for independent component analysis to be performed on the output layer signals.

In some embodiments, feedback (e.g., feedback amplitude) from a target node is amplified and/or filtered by one or more parameters (e.g., weight and agreement parameters). In some embodiments, filtered feedback is obtained by multiplying the feedback from the target node by weight and agreement. For example, a large weight and high agreement parameter result in a higher filtered feedback amplitude than a lower weight and/or a lower agreement parameter. In some embodiments, the filtered feedback is used (e.g., in place of the feedback from the target node) as the individual feedback from the target node (e.g., and used to calculate an aggregate feedback).

In some embodiments, the filtered feedback and/or aggregate feedback is used to adjust one or more connection weights. In some embodiments, a connection weight is updated based on the filtered feedback and the aggregate feedback. In some embodiments, each feedback is generated as a normal distribution and the corresponding gradient is zero at the apex of the distribution and at the positive and negative extremes of the distribution. The gradient would be the steepest at variance inflection points, which are wider with higher amplitude feedback. In this way, if the source activation direction is earlier than the target (aggregate) feedback direction, the gradient would be positive, and, if the source activation direction is later than the target (aggregate) feedback direction, the gradient would be negative. While near equilibrium, the connection direction perturbs around the apex, which results in small changes in the weight. However, when something unexpected happens, some activations occur earlier than others (e.g., due to more and/or earlier incoming signals). The directional differential causes rebalancing of the weights (e.g., based on target noise level, current weight, agreement filter, and/or aggregate feedback). Notably, near equilibrium, aggregate feedback has limited impact on the connection weight as the connection is stable and the aggregate spread is wide (e.g., having a low gradient). However, in a rebalancing, large weight connections are in different directions and the aggregate feedback has a greater impact on the connection weight.

In some embodiments, each node has an egress state and an ingress state. The egress state may be 'neutral' or 'reach' (e.g., indicating that additional downstream connections may be established) and the ingress state may be 'neutral' or 'accept' (e.g., indicating that additional upstream connections may be accepted). In some embodiments, the egress and/or ingress state is based on a comparison between the short-term average and the long-term average and associated spread (e.g., as described above with respect to FIG. 3C). In accordance with the Central Limit Theorem, as more connections are added, the activation and/or the aggregate feedback distributions become more Gaussian, which in turn maximizes entropy.

As an example, when a source node and a target node are seeking to reach and accept connections (e.g., the source node has a reach egress state and the target node has an accept ingress state), the connection state between the source node and the target node may be switched to candidate or active. In some embodiments, whether to change the connection state is based on a proximity scope and/or an amount of agreement between the source node and the target node. For example, potential connections are evaluated and the connection with the highest amount of agreement is selected to be switched to candidate/active.

The proximity scope assumes that nearby data sources tend to be similar to one another. Thus, source and target nodes with appropriate ingress and egress states may be selected based on proximity ranges. In some embodiments, if a threshold amount of time elapses and respective short-term entropy does not converge within the corresponding long-term entropy range, then the proximity scope is enlarged.

In some embodiments, selecting a potential connection (e.g., a candidate connection) includes comparing the connection agreement to an agreement threshold (e.g., with a proximity factor). In some embodiments, the agreement threshold is based on proximity (e.g., the agreement threshold is higher if the nodes are further away). In some embodiments, the proximity factor changes dynamically (e.g., depending on whether the associated entropy converges). In some embodiments, in accordance with the connection agreement being greater than the agreement threshold, the connection is changed to the active state.

Figure 11:
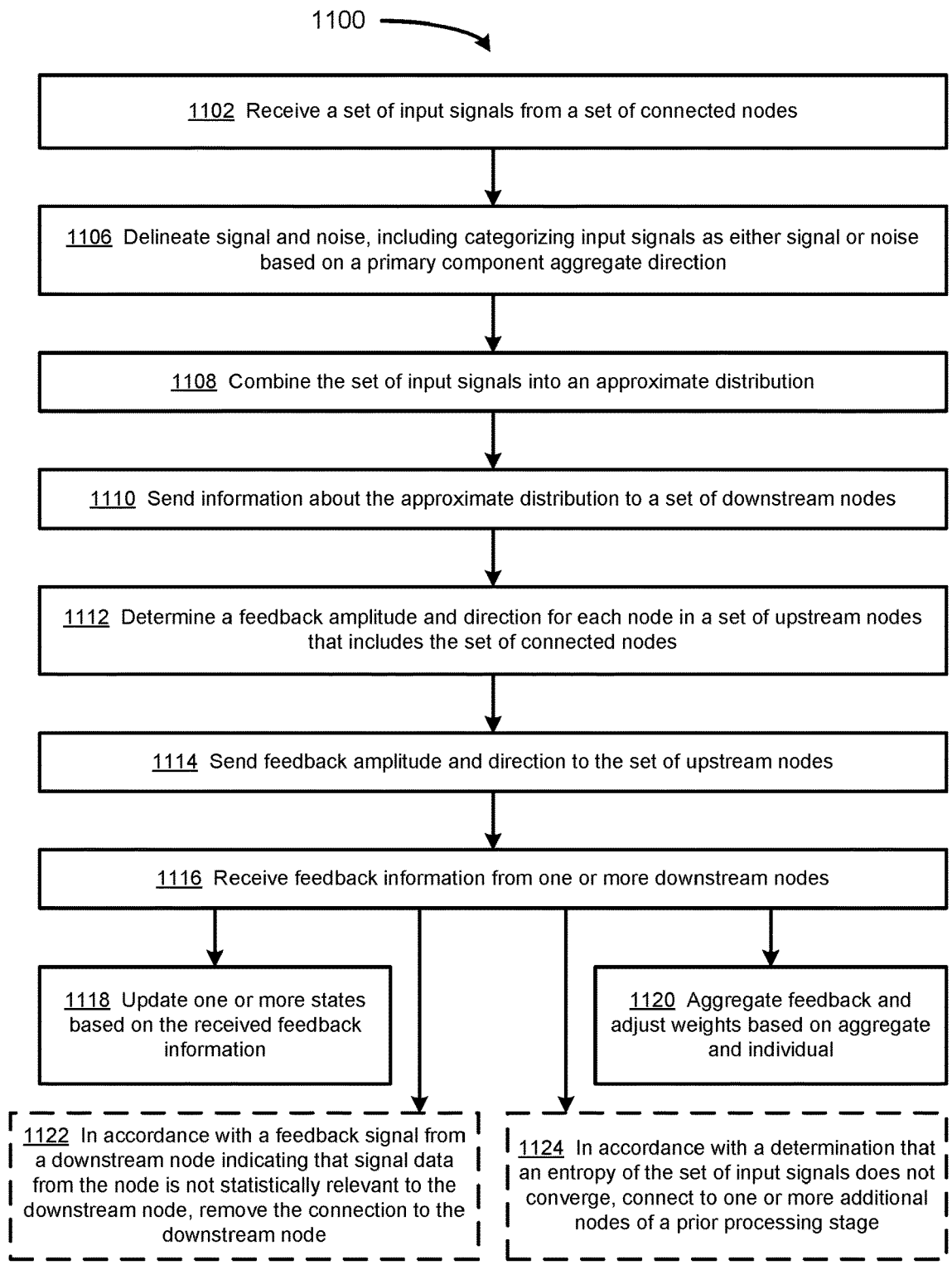
FIG. 11 is a flow diagram illustrating a process of operating a model node in accordance with some embodiments.

FIG. 11 is a flow diagram illustrating a method 1100 in accordance with some embodiments. The method 1100 is described below as being performed by a node (e.g., a node 130) of a model (e.g., the model(s) 632). In some embodiments, the node and/or model is operating at a computing system (e.g., including one or more servers and/or one or more user devices) having one or more processors and memory storing instructions for execution by the one or more processors.

The node receives (1102) a set of input signals from a set of connected nodes. For example, the node 810 in FIG. 8 receives an input signal from the node 804. As another example, the node 918 in FIG. 9A receives input signals from the nodes 906 and 910. In some embodiments, the set of input signals correspond to a user query. For example, the set of input signals correspond to a vectorized user query (and optionally additional context information). In some embodiments, the set of input signals correspond to one or more approximate PDRs. For example, the node 918 may receive a first approximate PDR from the node 906 corresponding to signal "h" and may receive a second approximate PDR from the node 910 corresponding to the signal "hi."

The node delineates (1106) signal and noise, including categorizing input signals as either signal or noise based on a primary component aggregate direction. For example, the node 810 delineates the primary signal "a" from the secondary signals "c," "e," "k," and "m." In some embodiments, each signal is categorized as either signal or noise.

The node combines (1108) the set of input signals into an approximate distribution. For example, the node 922 in FIG. 9A combines the primary signal "gh" from the node 914 and the primary signal "hi" from the node 918 (e.g., delineates the "h" portions of the signals and combines them to an entangled "h" signal).

The node sends (1110) information about the approximate distribution to a set of downstream nodes. For example, the node 918 transmits signal information to the node 922. In some embodiments, the node sends only a portion of its signal information to a downstream node. In some embodiments, the node sends at least a portion of the signal information to each of a plurality of downstream nodes (e.g., the node 922 sends signal information to two downstream nodes in FIG. 9B).

The node determines (1112) a feedback amplitude and direction for each node in a set of upstream nodes that includes the set of connected nodes. For example, the node 934 may determine feedback information for each of the nodes 922, 924, and 926.

The node sends (1114) feedback amplitude and direction to the set of upstream nodes. For example, the node 934 may send feedback information to each of the nodes 922, 924, and 926. In some embodiments, the node backward propagates feedback information as a vector (e.g., a vector with amplitude data and direction data). For example, an active node may backward propagate feedback direction and amplitude to each of its connected upstream (source) nodes. In some embodiments, the node forward propagates its activation direction and associated connection weight to its connected downstream (target) nodes.

The node receives (1116) feedback information from one or more downstream nodes. For example, the node 1002-5 in FIG. 10A may receive feedback information from each of the node 1002-8 and the node 1002-9.

The node updates (1118) one or more states based on the received feedback information. For example, the node may update one or more entropy states (e.g., a short-term entropy mean, a long-term entropy mean, or an entropy variance), and/or one or more egress states. In some embodiments, the node updates a per-connection agreement (e.g., using logistic regression), a connection state, and/or an egress entropy state based on the received feedback information. In some embodiments, updating the one or more states includes updating a connection from an inactive state to a candidate state (e.g., based on signal similarity).

The node aggregates (1120) feedback and adjusts weights based on aggregate and individual. For example, the node combines individual feedback from different nodes into an approximate aggregate feedback. In some embodiments, the amplitude feedback is filtered by agreement between the node and the downstream node providing the feedback. In some embodiments, an aggregate gradient descent distribution is approximated from a series of vectors, where each vector has (i) direction, and (ii) agreement-filtered amplitude multiplied by an associated weight.

In some embodiments, in accordance with a feedback signal from a downstream node indicating that signal data from the node is not statistically relevant to the downstream node, the node removes (1122) the connection to the downstream node. For example, the node changes a state of the connection between the node and the downstream node from an active state to an inactive state (also sometimes referred to as a 'dormant' state). In some embodiments, setting the connection state to the inactive state includes resetting a weight associated with the connection. In some embodiments, the node changes a state of the connection between the node and the downstream node from an active state to a candidate state.

In some embodiments, in accordance with a determination that an entropy of the set of input signals does not converge, the node (1124) connects to one or more additional nodes of a prior processing stage. For example, in accordance with a determination that an entropy of the set of input signals (e.g., sets of feedback signals) does not converge, the node requests additional signal data. In some embodiments, the one or more additional nodes comprise nodes that were previously coupled to the node via respective candidate connections. In some embodiments, the additional node(s) are identified using global state information. In some embodiments, the additional node(s) are selected based on signal proximity. In some embodiments, the additional node(s) are selected randomly. In some embodiments, connecting to an additional node comprises setting a connection to the additional node as active and assigning an initial weight to the connection.

Although FIG. 11 illustrates a number of logical stages in a particular order, stages that are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 12B:
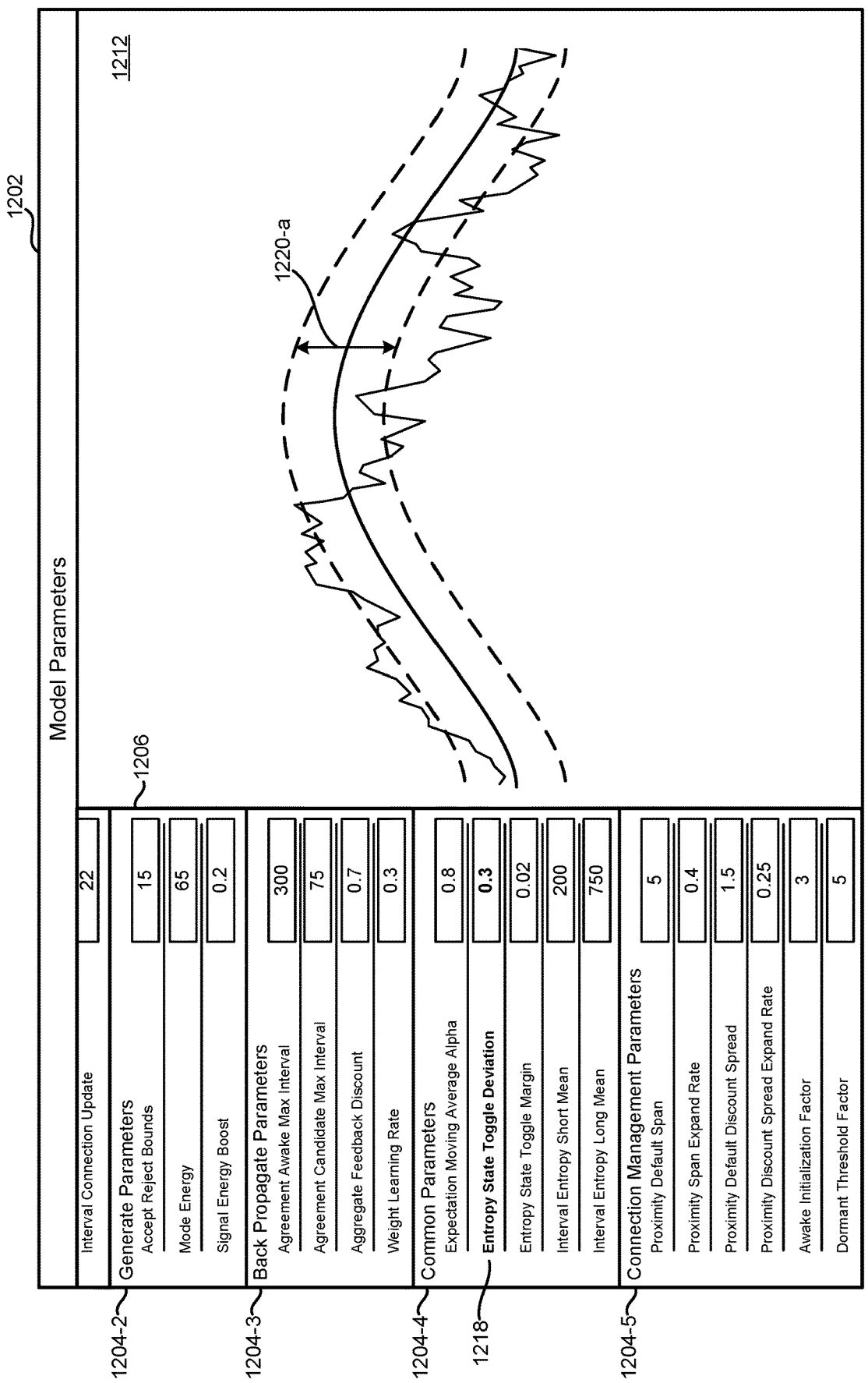
Figure 12C:
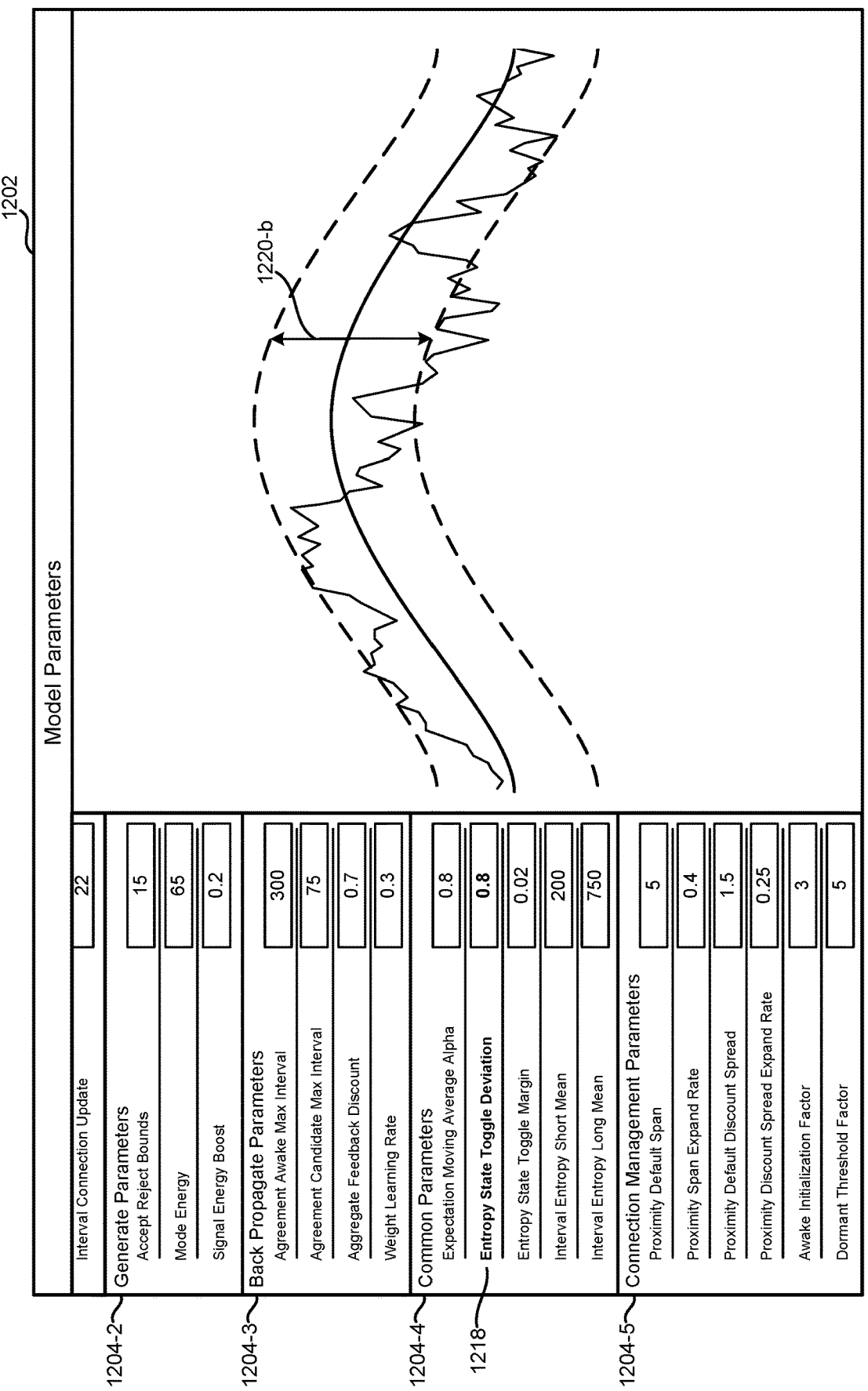

FIGS. 12A-12C illustrate a user interface 1202 for adjusting example model parameters in accordance with some embodiments. In some embodiments, the user interface 1202 is presented using a web browser or application (e.g., one of the applications 628 of FIG. 6). The user interface 1202 in FIG. 12A includes a section 1206 with a list of model parameters (e.g., hyperparameters) and a visualization section 1212. The list of model parameters includes a set of network parameters 1204-1, a set of generate parameters 1204-2, a set of back propagate parameters 1204-3, a set of common parameters 1204-4 (e.g., generate and/or propagate parameters), and a set of connection management parameters 1204-5. In some embodiments, the model includes other parameters not shown in FIG. 12A. In the example of FIG. 12A, the user interface 1202 includes respective input regions (e.g., input region 1205) to adjust the corresponding model parameters.

In the example of FIG. 12A, the network parameters 1204-1 include a time step start parameter, a time step interval parameter (e.g., governing forward and backward propagation within the model), an interval neuron state check parameter (e.g., governing update rates for node states and/or associated connections), and an interval connection update (e.g., governing connection update rates). In some embodiments, the network parameters 1204-1 include a subset or superset of the parameters shown in FIG. 12A. The generate parameters 1204-2 include an accept reject bounds parameter (e.g., governing an outlier boundary for a floor/ceiling), a mode energy parameter (e.g., governing a mode energy threshold), and a signal energy boost parameter (e.g., governing a feedback boost factor for low variance signals). In some embodiments, the generate parameters 1204-2 include a subset or superset of the parameters shown in FIG. 12A. The back propagate parameters 1204-3 include an agreement awake max interval parameter (e.g., governing a maximum interval duration to update agreement for an active state), an agreement candidate max interval parameter (e.g., governing a maximum interval duration to update agreement for a candidate state), an aggregate feedback discount parameter (e.g., governing an aggregate feedback discount rate when combining individual feedback), and a weight learning rate (e.g., governing a rate to reflect gradient to the corresponding weight). In some embodiments, the back propagate parameters 1204-3 include a subset or superset of the parameters shown in FIG. 12A. For example, the back propagate parameters 1204-3 may include an agreement interval parameter (e.g., governing agreement interval durations). The common parameters 1204-4 include an expectation moving average alpha parameter (e.g., governing a factor for an exponential smoothing moving average), an entropy state toggle deviation parameter (e.g., governing an acceptable range of deviation of a short-term mean from a long-term mean), an entropy state toggle margin (e.g., governing a margin to prevent flip-flopping between an equilibrium state and a non-equilibrium state), an interval entropy short mean parameter (e.g., governing an interval duration for the short-term mean), and an interval entropy long mean parameter (e.g., governing an interval duration for the long-term mean). In some embodiments, the common parameters 1204-4 include a subset or superset of the parameters shown in FIG. 12A.

FIG. 12B illustrates the user interface 1202 in which the section 1206 with the list of model parameters has scrolled down to display more parameters of the connection management parameters 1204-5. For example, FIG. 12B illustrates a transition from FIG. 12A in response to a user input such as a scroll gesture. In FIG. 12B, the entropy state toggle deviation parameter 1218 is selected (as indicated by the bolded text) and the visualization section 1212 includes a visualization of the short-term and long-term means (e.g., corresponding the illustration described with respect to FIG. 3C). In the example of FIG. 12B, the entropy state toggle deviation parameter 1218 has a value of 0.5, which corresponds to a range of 1220-*a* in the visualization.

In FIG. 12B, the connection management parameters 1204-5 include a proximity default span parameter (e.g., governing a layer width to mark as candidates), a proximity span expand rate parameter (e.g., governing a rate for expanding the span for an elapsed interval), a proximity default discount spread parameter (e.g., governing a spread width for a distribution agreement discount when considering changing a connection from candidate to active), a proximity discount spread expand rate parameter (e.g., governing a rate for expanding the discount spread for an elapsed interval), an awake initialization factor parameter (e.g., governing a weight for changing a connection from candidate to active), and a dormant threshold factor parameter (e.g., governing a threshold for changing a connection from active to inactive). In some embodiments, the connection management parameters 1204-5 include a subset or superset of the parameters shown in FIG. 12B.

FIG. 12C illustrates the user interface 1202 with the entropy state toggle deviation parameter 1218 selected and the value of the parameter set to 0.8 (e.g., adjusted from 0.5 as shown in FIG. 12B). The visualization in FIG. 12C has updated correspondingly to have a range of 1220-*b* (larger than the range 1220-A in FIG. 12B). Thus, FIGS. 12B-12C illustrate an example updating a model parameter and updating a corresponding visualization for the model parameter. In some embodiments, model parameters are updatable via a command prompt or other type of user interface. In some embodiments, the user interface includes additional information not shown in FIGS. 12A-12C such as a description of each parameter and/or an indication of parameter boundaries. In some embodiments, the user interface includes an option to save (store to memory) updated parameters and/or an option to revert updated parameters.

Turning now to some example embodiments.

(A1) In one aspect, some embodiments include a method (e.g., the method 100) of providing inferences using probabilistic machine-learning. The method includes: (i) receiving a set of inputs at a probabilistic machine-learning model, where the probabilistic machine-learning model comprises a set of nodes sparsely coupled to one another in accordance with associations learned from a set of previously received inputs; (ii) generating, via a first subset of the set of nodes, a set of intermediate probability distribution representations (PDRs) by aggregating respective subsets of the set of inputs, where: (a) the set of intermediate PDRs is approximated from the aggregated respective subsets of the set of inputs, and (b) generating the set of intermediate PDR includes, in accordance with a determination that an entropy of inputs at a respective node of the first subset of nodes does not converge, connecting the respective node to one or more additional nodes of the set of nodes; (iii) generating, via a second subset of the set of nodes, a set of final PDRs based on the set of inputs and the set of intermediate PDRs; and (iv) generating an inference for the set of inputs by applying an independent component analysis to the set of final PDRs. In some embodiments, the set of intermediate PDRs is generated by applying an independent component analysis to the aggregated respective subsets of the set of inputs. In some situations, a probabilistic machine-learning model is a deep structured probabilistic model that minimizes information loss and computational complexity through Gaussian mixture composition and decomposition. In some embodiments, the probabilistic machine-learning model is configured to identify stable low-variance connections between nodes. In some embodiments, the probabilistic machine-learning model is configured to optimize representations that minimize information loss (e.g., as opposed to optimizing between data and a label).

(B1) In another aspect, some embodiments include a method of utilizing a probabilistic machine-learning model with no offline training to provide query responses. The method includes: (i) receiving a query from a user device; (ii) providing the query to a computing system that includes a probabilistic machine-learning model, where the probabilistic machine-learning model has learned a set of associations based on input data from a plurality of earlier queries and without any offline training; (iii) in response to providing the query, receiving a response from the probabilistic machine-learning model, where the response is generated based on approximate probability distributions identified by the probabilistic machine-learning model in response to the query; and (iv) sending information about the response from the probabilistic machine-learning model to the user device. In some embodiments, an amount of approximation for the approximate probability distributions is based on a hyperparameter of the probabilistic machine-learning model. In some embodiments, the query is generated by a user. In some embodiments, the query is generated by a device or system. In some embodiments, the user device is a component of the computing system. In some embodiments, the probabilistic machine-learning model is a component of the user device.

(C1) In another aspect, some embodiments include a method of utilizing a probabilistic machine-learning model with no offline training to provide inferences. The method includes: (i) providing a query to a computing system that includes a probabilistic machine-learning model a first time, where the probabilistic machine-learning model has a set of learned associations based on input data from a plurality of earlier queries and without any offline training; (ii) after providing the query, receiving a first response to the query and presenting information about the first response to a user device; (iii) providing the query to the computing device a second time; and (iv) after providing the query the second time, receiving a second response to the query and presenting information about the second response to the user device, where content of the second response is distinct from content of the first response. For example, due to the use of a probabilistic model, the same inputs may not result in the same outputs (e.g., the model is not deterministic).

(D1) In another aspect, some embodiments include a method of generating responses using a probabilistic machine-learning model. The method includes: (i) receiving a user query; (ii) generating a set of inputs based on the user query; (iii) providing the set of inputs to a computing system that includes a probabilistic machine-learning model; (iv) in response to the providing, receiving an inference from the computing system, where the inference is based on applying an independent component analysis to a set of approximate probability distribution representations (PDRs) generated from the set of inputs; and (v) generating a response to the user query based on the received inference.

(E1) In another aspect, some embodiments include a method of generating responses using a probabilistic machine-learning model. The method includes: (i) receiving a set of inputs at a probabilistic machine-learning model that comprises a set of nodes; (ii) at a node of the set of nodes: (a) receiving a set of input signals corresponding to the set of inputs from a first subset of the set of nodes; (b) generating, based on the received set of input signals: a forward signal comprising a set of approximate probability distribution representations and a feedback signal comprising a set of feedback amplitudes and directions; (iii) providing the forward signal to a second subset of the set of nodes and providing the feedback signal to the first subset of the set of nodes; and (iv) updating operating states of the first subset of the set of nodes based on the feedback signal. In some embodiments, the method further comprises generating an inference for the set of inputs based on the forward signal.

(F1) In another aspect, some embodiments include a method of providing inferences using probabilistic machine-learning. The method includes: (i) receiving a set of inputs at a probabilistic machine-learning model (e.g., the model 128); (ii) generating, via the probabilistic machine-learning model, a set of approximate probability distribution representations (e.g., the PDRs 140) from the set of inputs; and (iii) generating an inference for the set of inputs by applying an independent component analysis to the set of approximate PDRs. For example, the probabilistic model is a deep-structured probabilistic model. The probabilistic model is configured to reduce/minimize hallucinations by learning latent representations. As an example, the probabilistic model may have a computation complexity of $O(n \log(n))$.

(F2) In some embodiments of any of A1-F1: (i) the probabilistic model comprises a set of nodes, where the set of nodes is sparsely coupled to one another based on learned associations; and (ii) each node of the set of nodes is configured to generate an approximate PDR by aggregating signals from a respective subset of the set of nodes. For example, each node represents a neuron that outputs a PDR over time based on aggregated inputs. In some embodiments, energy is distributed based on a covariance of direction and noise of target nodes. In some embodiments, if a node signal does not match with a primary component direction of a target node, the node signal is passed as a secondary component (e.g., to be considered/discovered when capacity becomes available). In some embodiments, the respective subset of the set of nodes is in a first virtual processing layer of the model and the node is in a subsequent virtual processing layer of the model.

(F3) In some embodiments of F2, each node in the set of nodes is configured to provide a primary component signal and a secondary component signal to a respective second subset of the set of nodes. For example, the respective second subset of the set of nodes is downstream from the node in terms of processing the inputs to generate an inference.

(F4) In some embodiments of F2 or F3, the set of nodes is arranged in a plurality of virtual layers. As an example, a first virtual layer corresponds to a first processing stage, a second virtual layer corresponds to a second (subsequent) processing stage, and so on until a final virtual layer is coupled to an output component (e.g., a classifier) of the model. For example, each node is connected to a respective set of source nodes whose inputs have rounded to a smooth normal distribution (e.g., primary component signals, secondary component signals, and noise aggregate to a stationary normal distribution (e.g., identified via a Kolmogorov-Smirnov test)).

(F5) In some embodiments of any of F2-F4, a node of the set of nodes is configured to: (i) combine a set of input signals into an approximate distribution, (ii) delineate signal and noise, (iii) determine a feedback amplitude and direction, and (iv) update one or more node states. For example, the node may update an activation threshold, a noise expectation, and/or ingress entropy states (e.g., based on deviation from Gaussian). Combining the set of input signals (e.g., direction and weight) into an approximate distribution may include determining an activation direction based on an activation threshold and/or noise expectation. In some embodiments, egress entropy states are calculated based on a deviation from Gaussian in a corresponding probability distribution representation.

(F6) In some embodiments of F5, delineating signal and noise includes categorizing input signals as either signal or noise based on a primary component aggregate direction. For example, depending on the size of the noise bucket, the spread of the expected input distribution can be established.

(F7) In some embodiments of F5 or F6, the node is further configured to determine aggregate feedback by aggregating individual feedback from a plurality of subsequent nodes. For example, individual feedback amplitude is filtered based on agreement and an aggregate gradient descent distribution is approximated from the filtered individual feedback. In some embodiments, a signal weight is updated based on the aggregate gradient and an individual gradient at the signal direction.

(F8) In some embodiments of any of F5-F7, the method further includes, in accordance with a determination that an entropy of the set of input signals does not converge, connecting the node to one or more additional nodes of a prior processing stage. For example, the node may acquire more signals if entropy does not converge. In some embodiments, the one or more additional nodes are identified based on proximity to the node and/or agreement parameters (e.g., an agreement parameter may be a logistic regression of how neuron activation directions covariate). In some embodiments, a set of candidate nodes is identified (e.g., node state switched from dormant to candidate) and then a subset of the set of candidate nodes is selected (e.g., node state switched from candidate to awake). In some embodiments, nodes are selected using a Thompson sampling based on beta distributions. In some embodiments, each additional node in the one or more additional nodes is assigned an initial weight. In some embodiments, additional nodes are selected until a short-term smoothness is within a preset variance range of long-term smoothness. For example, when the short-term smoothness is within the preset variance range of long-term smoothness (e.g., managed with entropy states), no further additional nodes are selected.

(F9) In some embodiments of any of F5-F8, the method further includes, in accordance with a determination that information at the node is not being used by downstream nodes, connecting the node to one or more additional nodes of a subsequence processing stage. For example, in accordance with a determination that at least a threshold percentage of information at the node is unused, the node is indicated as a candidate source node. In some embodiments, candidate source nodes are coupled with candidate target nodes (e.g., connections between the nodes are activated) during a connection management processing stage. In some embodiments, in accordance with a determination that at least a percentage of information at the node is not being used by downstream nodes, the node is indicated as a candidate source node. For example, the percentage may be 10%, 15%, 25%, 40%, or 60%.

(F10) In some embodiments of any of F5-F9, the method further includes, in accordance with a determination that respective input signals from one or more nodes of a prior processing stage are not statistically relevant (e.g., have a relevance below a threshold relevance value), removing the connections between the one or more nodes and the node (e.g., transitioning the connection state from awake to dormant). In some embodiments, removing the connections comprises resetting the respective weights from the one or more nodes. In some embodiments, a minimum set of connections is maintained for each node (e.g., the minimum set that meets smoothness criteria).

(F11) In some embodiments of any of F2-F10, each node of the set of nodes is configured to forward propagate a two-dimensional vector consisting of a directional value and a weight value. For example, the weight value represents an amplitude of the signal. As an example, an active source neuron passes its activation direction and connection weight to its connected target neurons. In some embodiments, a node receives a set of input vectors, each vector indicating a direction and a weight. In some embodiments, the node outputs an activation direction and feedback (e.g., an amplitude and direction). In some embodiments, the node updates an activation threshold and/or ingress states.

(F12) In some embodiments of any of F2-F11, each node of the set of nodes is configured to backwards propagate a two-dimensional vector consisting of a directional value and an amplitude value. As an example, an active target neuron passes its feedback direction and amplitude to its connected source neurons.

(F13) In some embodiments of F12, a weight value is derived using feedback (e.g., individual and/or aggregate feedback). In some embodiments, the feedback is filtered by agreement prior to being used to update the weight value. For example, weights may be updated based on how much mutual information is shared with the targets. As an example, weights may be adjusted by an agreement filtered gradient generated from aggregate and individual feedback. If source activation and target feedback directions align, then the gradient at the apex is zero. If the source direction is less than the target direction, then the gradient is positive going up to the apex. Thus, high amplitude feedback has a strong organizing effect and weights tend to point in the direction of the target giving strong feedback that has the highest agreement with the source.

(F14) In some embodiments of any of F2-F13, each node in the set of nodes has a node type selected from a group consisting of a standard node, a sensor node, and a label node. In some embodiments, the available node types include one or more of a sensor node (e.g., an input node), a standard node (e.g., a processing node), and a label node (e.g., an output node). For example, a sensor node may be configured for an initialized direction, for noise injection, and/or for replication. As another example, a label node may be configured for noise injection.

(F15) In some embodiments of any of F2-F14, each node of the set of nodes has a node state indicating one or more of: an activation threshold, a noise expectation, an ingress entropy mean, an ingress entropy variance, an ingress state, an egress entropy mean, an egress entropy variance, and an egress state. For example, the ingress state may be accept or neutral and the egress state may be reach or neutral.

(F16) In some embodiments of any of A1-E1 and F1-F15: (i) the probabilistic model includes a set of nodes and a set of connections that interconnect the set of nodes, (ii) a connection of the set of connections includes a set of connection parameters, and (iii) the set of connection parameters includes a weight parameter, an agreement parameter, and a connection state parameter. For example, the weight parameter may have a value between 0 and a sampling threshold. As another example, the agreement parameter may have a value from 0 to 1. As another example, the connection state parameter may have values indicating an awake state, a candidate state, or a dormant state.

(F17) In some embodiments of F16, the agreement parameter is determined based on a logistic regression aggregation.

(F18) In some embodiments of any of A1-E1 and F1-F17, the set of PDRs is a set of Gaussian distribution representations.

(F19) In some embodiments of any of A1-E1 and F1-F18, the set of PDRs is generated in part by identifying and combining a set of complementary distributions.

(F20) In some embodiments of any of A1-E1 and F1-F19, the set of PDRs is generated using a non-biased estimator.

(F21) In some embodiments of any of A1-E1 and F1-F20, each PDR in the set of PDRs comprises a non-parametric approximation. For example, the probabilistic model is configured to combine inputs based on similarity and approximate an aggregate distribution. The probabilistic model may also be configured to approximate feedback so inputs can be optimized on the source nodes (neurons).

(F22) In some embodiments of any of A1-E1 and F1-F21, the probabilistic model is only trained via online training. For example, the probabilistic model does not undergo offline training. The probabilistic model is not trained via an offline training set.

(F23) In some embodiments of any of A1-E1 and F1-F22, the set of approximate PDRs is generated based on the set of inputs and a set of intermediate PDRs, and the set of intermediate PDRs is generated using the independent component analysis.

(F24) In some embodiments of any of A1-E1 and F1-F23, an amount of approximation for the set of approximate PDRs is based on a hyperparameter of the probabilistic machine-learning model.

(G1) In another aspect, some embodiments include a computing system (e.g., the computing system 124) that includes: (i) control circuitry (e.g., the processor(s) 602); and (ii) memory (e.g., the memory 622) coupled to the control circuitry, the memory storing a probabilistic machine-learning model composed of a set of nodes (e.g., the nodes 130), where the set of nodes is sparsely coupled to one another based on learned associations, where: (a) each node of the set of nodes is configured to generate a respective approximate probability distribution representation (PDR) by aggregating inputs from a corresponding subset of the set of nodes, and (b) each node of the set of nodes is configured to forward propagate a two-dimensional vector consisting of a directional value and a weight value. In some embodiments, the probabilistic machine-learning model further comprises a set of input nodes (e.g., sensor nodes) coupled to the set of nodes. In some embodiments, the probabilistic machine-learning model further comprises a set of output nodes coupled to the set of nodes. In some embodiments, the probabilistic machine-learning model further comprises an output component (e.g., a classifier) coupled to the set of nodes. In some embodiments, the computing system is configured to perform any of the methods of A1-E1 and F1-F22.

In another aspect, some embodiments include a computing system (e.g., the computing system 124 and/or the user device(s) 120) including control circuitry (e.g., the CPU(s) 604, the GPU(s) 606 and/or the NPU(s) 608) and memory (e.g., the memory 622) coupled to the control circuitry, the memory storing one or more sets of instructions configured to be executed by the control circuitry, with the one or more sets of instructions including instructions for performing any of the methods described herein (e.g., the methods 100 and 1100 as well as A1, B1, C1, D1, E1, and F1-F24 above).

In yet another aspect, some embodiments include a non-transitory computer-readable storage medium storing one or more sets of instructions for execution by control circuitry of a computing system, with the one or more sets of instructions including instructions for performing any of the methods described herein (e.g., the methods 100 and 1100 as well as A1, B1, C1, D1, E1, and F1-F24 above).

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of providing inferences using probabilistic machine learning, the method comprising:
   receiving a set of inputs at a probabilistic machine-learning model, wherein the probabilistic machine-learning model comprises a set of nodes sparsely coupled to one another in accordance with associations learned from a set of previously-received inputs;
   generating, via a first subset of the set of nodes, a first set of multi-dimensional vectors corresponding to intermediate probability distribution representations (PDRs), wherein the first set of multi-dimensional vectors is generated by aggregating respective subsets of the set of inputs, and wherein the first set of multi-dimensional vectors corresponding to the intermediate PDRs is approximated from the aggregated respective subsets of the set of inputs;
   generating, via a second subset of the set of nodes, a second set of multi-dimensional vectors corresponding to final PDRs, wherein the second set of multi-dimensional vectors corresponding to the final PDRs are approximations generated based on the set of inputs and the first set of multi-dimensional vectors corresponding to the intermediate PDRs; and
   generating an inference for the set of inputs by applying an independent component analysis to the second set of multi-dimensional vectors corresponding to the final PDRs.

2. The method of claim 1, wherein each node of the set of nodes is configured to provide a primary component signal and a secondary component signal to at least one downstream node.

3. The method of claim 1, wherein each node of the set of nodes is included in one of a plurality of virtual layers, the plurality of virtual layers arranged based on the associations learned from the set of previously-received inputs.

4. The method of claim 1, wherein a first node of the set of nodes is configured to:
   combine a set of input signals into an approximate distribution,
   delineate signal and noise,
   determine a feedback amplitude and direction, and
   update one or more node states.

5. The method of claim 4, wherein the delineating signal and noise comprises categorizing input signals as either signal or noise based on a primary component aggregate direction.

6. The method of claim 4, wherein the first node is further configured to determine aggregate feedback by aggregating individual feedback from a plurality of subsequent nodes.

7. The method of claim 4, further comprising, in accordance with a determination that respective input signals from one or more nodes of a prior processing stage are not statistically relevant, removing connections between the one or more nodes and the first node.

8. The method of claim 1, further comprising, in accordance with a determination that an entropy of the set of input signals for a first node of the set of nodes does not converge, connecting the first node to one or more additional nodes of the set of nodes, wherein the one or more additional nodes correspond to a prior processing stage.

9. The method of claim 1, further comprising, in accordance with a determination that at least a threshold percentage of information at a first node of the set of nodes is not being used by downstream nodes of the of the set of nodes, connecting the first node to one or more additional nodes of the set of nodes, wherein the one or more additional nodes correspond to a subsequent processing stage.

10. The method of claim 1, wherein each node of the set of nodes is configured to forward propagate a two-dimensional vector consisting of a directional value and a weight value.

11. The method of claim 1, wherein each node of the set of nodes is configured to backwards propagate a two-dimensional vector consisting of a directional value and an amplitude value.

12. The method of claim 11, wherein the two-dimensional vector comprises feedback, and wherein the feedback is filtered based on an agreement between a node providing the feedback and a node receiving the feedback.

13. The method of claim 12, wherein the node receiving the feedback aggregates received feedback from a set of downstream nodes to generate aggregated feedback.

14. The method of claim 13, wherein a weight value for a connection between the node receiving the feedback and the node providing the feedback is derived based on the filtered feedback and/or the aggregated feedback.

15. The method of claim 1, wherein each node of the set of nodes has a node state indicating one or more of: an activation threshold, a noise expectation, an ingress entropy mean, an ingress entropy variance, an ingress state, an egress entropy mean, an egress entropy variance, and an egress state.

16. The method of claim 1, wherein:
   the probabilistic machine-learning model includes a set of connections that interconnect respective nodes of the set of nodes,
   a connection of the set of connections includes a set of connection parameters, and
   the set of connection parameters includes a weight parameter, an agreement parameter, and a connection state parameter.

17. The method of claim 1, wherein the set of intermediate PDRs and the set of final PDRs comprise Gaussian distribution representations.

18. The method of claim 1, wherein the set of PDRs is generated in part by identifying and combining a set of complementary distributions.

19. A computing system, comprising:
   one or more processors;
   memory; and
   a machine-learning component stored in the memory and configured for execution by the one or more processors, the machine-learning component comprising:

an input layer configured to receive a set of inputs;
a probabilistic machine-learning model coupled to the input layer, the probabilistic machine-learning model comprising a set of nodes sparsely coupled to one another in accordance with associations learned from a set of previously-received inputs, wherein the set of nodes comprises:
  a first subset of the set of nodes configured to generate a first set of multi-dimensional vectors corresponding to intermediate probability distribution representations (PDRs), wherein the first set of multi-dimensional vectors is generated by aggregating respective subsets of the set of inputs, and wherein the first set of multi-dimensional vectors corresponding to the intermediate PDRs is approximated from the aggregated respective subsets of the set of inputs; and
  a second subset of the set of nodes configured to generate a second set of multi-dimensional vectors corresponding to final PDRs, wherein the second set of multi-dimensional vectors corresponding to the final PDRs are approximations generated based on the set of inputs and the first set of multi-dimensional vectors corresponding to the intermediate PDRs; and
an output layer configured to generate an inference for the set of inputs by applying an independent component analysis to the second set of multi-dimensional vectors corresponding to the final PDRs.

20. A non-transitory computer-readable storage medium storing a machine-learning component configured for execution by a computing system having one or more processors and memory, the machine-learning component comprising:
  an input layer configured to receive a set of inputs;
  a probabilistic machine-learning model coupled to the input layer, the probabilistic machine-learning model comprising a set of nodes sparsely coupled to one another in accordance with associations learned from a set of previously-received inputs, wherein the set of nodes comprises:
    a first subset of the set of nodes configured to generate a first set of multi-dimensional vectors corresponding to intermediate probability distribution representations (PDRs), wherein the first set of multi-dimensional vectors is generated by aggregating respective subsets of the set of inputs, and wherein the first set of multi-dimensional vectors corresponding to the intermediate PDRs is approximated from the aggregated respective subsets of the set of inputs; and
    a second subset of the set of nodes configured to generate a second set of multi-dimensional vectors corresponding to final PDRs, wherein the second set of multi-dimensional vectors corresponding to the final PDRs are approximations generated based on the set of inputs and the first set of multi-dimensional vectors corresponding to the intermediate PDRs; and
  an output layer configured to generate an inference for the set of inputs by applying an independent component analysis to the second set of multi-dimensional vectors corresponding to the final PDRs.

* * * * *